United States Patent
Um et al.

(10) Patent No.: US 11,044,747 B2
(45) Date of Patent: Jun. 22, 2021

(54) METHOD FOR SCHEDULING UPLINK TRANSMISSION IN COMMUNICATION NETWORK

(71) Applicant: Electronics and Telecommunications Research Institute, Daejeon (KR)

(72) Inventors: Jung Sun Um, Daejeon (KR); Hoi Yoon Jung, Daejeon (KR); Seung Keun Park, Daejeon (KR); Sung Jin Yoo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 51 days.

(21) Appl. No.: 15/770,838

(22) PCT Filed: Feb. 3, 2017

(86) PCT No.: PCT/KR2017/001174
§ 371 (c)(1),
(2) Date: Apr. 25, 2018

(87) PCT Pub. No.: WO2017/135721
PCT Pub. Date: Aug. 10, 2017

(65) Prior Publication Data
US 2018/0317255 A1 Nov. 1, 2018

(30) Foreign Application Priority Data

Feb. 4, 2016 (KR) .................. 10-2016-0014475
May 13, 2016 (KR) .................. 10-2016-0058923
(Continued)

(51) Int. Cl.
*H04W 72/14* (2009.01)
*H04W 72/12* (2009.01)
(Continued)

(52) U.S. Cl.
CPC ........... *H04W 72/14* (2013.01); *H04L 5/0092* (2013.01); *H04L 27/26* (2013.01); *H04W 16/14* (2013.01);
(Continued)

(58) Field of Classification Search
CPC ............ H04W 16/18; H04W 74/0808; H04W 73/042; H04W 72/0446; H04W 74/0816; H04L 5/001
See application file for complete search history.

(56) References Cited

U.S. PATENT DOCUMENTS 9,240,852 B2    1/2016  Yang et al.
9,515,787 B2   12/2016  Ratasuk et al.
(Continued)

FOREIGN PATENT DOCUMENTS

KR   10-2015-0140629 A    12/2015
KR   10-2016-0041025 A     4/2016
(Continued)

OTHER PUBLICATIONS

Author Unknown, Remaining Details on LBT, R1-156510, Nov. 22, 2015, pp. 1-4 (Year: 2015).*
(Continued)

*Primary Examiner* — Christopher M Crutchfield
(74) *Attorney, Agent, or Firm* — NSIP Law

(57) ABSTRACT

Disclosed is a method for scheduling an uplink transmission in a communication network. A terminal operation method comprises the steps of: detecting a control channel of a subframe #n transmitted from a base station; receiving an uplink grant from the control channel; and transmitting, to the base station, a plurality of subframes scheduled by the uplink grant. Thus, the performance of the communication network may be improved.

32 Claims, 18 Drawing Sheets

(30) Foreign Application Priority Data

Aug. 9, 2016 (KR) ........................ 10-2016-0101482
Jan. 25, 2017 (KR) ........................ 10-2017-0011943

(51) Int. Cl.

| | |
|---|---|
| H04W 16/14 | (2009.01) |
| H04L 5/00 | (2006.01) |
| H04L 27/26 | (2006.01) |
| H04W 16/18 | (2009.01) |
| H04W 74/08 | (2009.01) |

(52) U.S. Cl.

CPC ....... *H04W 16/18* (2013.01); *H04W 72/1268* (2013.01); *H04L 5/001* (2013.01); *H04L 5/005* (2013.01); *H04L 5/0035* (2013.01); *H04L 5/0051* (2013.01); *H04L 27/2636* (2013.01); *H04W 74/0808* (2013.01)

(56) References Cited

U.S. PATENT DOCUMENTS

| | | | |
|---|---|---|---|
| 2003/0147366 A1* | 8/2003 | Sebire ................... | H04L 1/0068 370/337 |
| 2009/0046605 A1 | 2/2009 | Gao et al. | |
| 2011/0075624 A1* | 3/2011 | Papasakellariou .... | H04L 5/0053 370/329 |
| 2013/0033979 A1 | 2/2013 | Taoka et al. | |
| 2014/0301299 A1* | 10/2014 | Wu ....................... | H04L 5/0053 370/329 |
| 2014/0307567 A1 | 10/2014 | Li et al. | |
| 2015/0085794 A1 | 3/2015 | Chen et al. | |
| 2015/0085797 A1 | 3/2015 | Ji et al. | |
| 2015/0245376 A1 | 8/2015 | Bashar et al. | |
| 2015/0264662 A1 | 9/2015 | Sahlin et al. | |
| 2015/0264708 A1 | 9/2015 | Li et al. | |
| 2015/0319774 A1 | 11/2015 | Cai et al. | |
| 2016/0302226 A1 | 10/2016 | Kim et al. | |
| 2016/0330761 A1* | 11/2016 | Svedman .......... | H04W 72/1289 |
| 2017/0048880 A1* | 2/2017 | Anderson ......... | H04W 72/1226 |
| 2017/0279583 A1* | 9/2017 | Dinan ................. | H04L 5/0053 |
| 2017/0288833 A1* | 10/2017 | Islam .................... | H04L 5/0048 |
| 2017/0302493 A1* | 10/2017 | Yang .................... | H04L 1/0029 |
| 2017/0322395 A1* | 11/2017 | Lin ........................ | G02B 5/005 |
| 2018/0124749 A1* | 5/2018 | Park .................... | H04W 16/14 |
| 2018/0279350 A1* | 9/2018 | Jiang .................... | H04W 24/08 |
| 2018/0317244 A1* | 11/2018 | Um ....................... | H04L 5/0051 |
| 2019/0069312 A1* | 2/2019 | Oh ........................ | H04W 72/04 |
| 2019/0104540 A1* | 4/2019 | Karaki ............... | H04W 72/1289 |

FOREIGN PATENT DOCUMENTS

| | | |
|---|---|---|
| WO | WO 2016/163709 A1 | 10/2016 |
| WO | WO 2016/182238 A1 | 11/2016 |

OTHER PUBLICATIONS

Author Unknown, UL framework for LAA, R1-156994, Nov. 22, 2015, pp. 1-6 (Year: 2015).*

International Search Report dated May 23, 2017 in corresponding International Patent Application No. PCT/KR2017/001174 (2 pages in English and 2 pages in Korean).

"Outstanding issues on dynamic aperiodic SRS", Texas Instruments, *3GPP TSG RAN WG1 #62*, Madrid, Spain, Aug. 23-27, 2010 (4 pages in English).

"LBT and Frame Structure Design for LAA with DL and UL", Alcatel-Lucent Shanghai Bell, Alcatel-Lucent, *3GPP TSG RAN WG1 Meeting #81*, Fukuoka, Japan, May 25-29, 2015 (4 pages in English).

Extended European Search Report dated Jul. 25, 2019 in counterpart European Patent Application No. 17747766.8 (1 page in English).

Instruments, Texas. "Outstanding issues on dynamic aperiodic SRS." *3GPP TSG RAN WG1 #62*. Madrid, Spain, Aug. 23-27, 2010 (4 pages in English).

Alcatel-Lucent Shanghai Bell, Alcatel-Lucent "LBT and Frame Structure Design for LAA with DL and UL" *3GPP TSG RAN WG1* Meeting #81 Fukuoka, Japan, May 25-29, 2015 (4 pages in English).

CMCC "Discussion on issues related to UL channel access for LAA" *3GPP TSG RAN WG1 Meeting #82bis* Malmö, Sweden, Oct. 5-9, 2015 (4 pages in English).

* cited by examiner

ENDING POSITION

ENDING POSITION

METHOD FOR SCHEDULING UPLINK TRANSMISSION IN COMMUNICATION NETWORK

CROSS REFERENCE TO RELATED APPLICATIONS

This application is a U.S. National Stage Application of International Application No. PCT/KR2017/001174, filed on Feb. 3, 2017, which claims the benefit under 35 USC 119(a) and 365(b) of Korean Patent Application No. 10-2016-0014475, filed on Feb. 4, 2016, Korean Patent Application No. 10-2016-0058923, filed on May 13, 2016, Korean Patent Application No. 10-2016-0101482, filed on Aug. 9, 2016, and Korean Patent Application No. 10-2017-0011943, filed on Jan. 25, 2017 in the Korean Intellectual Property Office.

TECHNICAL FIELD

The present invention relates to a technique for scheduling uplink transmission, and more particularly to a technique for scheduling uplink transmission in a communication network supporting an unlicensed band.

BACKGROUND ART

Various wireless communication technologies are being developed in accordance with advancement of information communication technologies. Wireless communication technologies may be generally classified into technologies using licensed bands and technologies using unlicensed bands (e.g., industrial-scientific-medical (ISM) band) according to bands used by respective technologies. Since a licensed band is exclusively used by a specific operator, the technology using the licensed band may provide better reliability, communication quality, etc. than that using an unlicensed band.

There exists, as a representative cellular communication technology using a licensed band, a Long Term Evolution (LTE) or LTE-Advanced (LTE-A) standardized in a 3rd generation partnership project (3GPP). Thus, a base station or a user equipment (UE) supporting LTE or LTE-A may transmit or receive signals through a licensed band. Also, there exists, as a representative wireless communication technology using an unlicensed band, a wireless local area network (WLAN) defined in IEEE 802.11. Thus, an access point or a station supporting the WLAN may transmit or receive signals through the unlicensed band.

Meanwhile, as mobile traffics are increasing explosively, additional licensed bands are required in order to process such the increasing mobile traffics through licensed bands. However, licensed bands are limited resources. Since a licensed band is obtained usually through an auction held among operators, astronomical investment may be demanded for obtaining an additional licensed band. In order to resolve the above-described problem, a method for providing LTE or LTE-A services through an unlicensed band may be considered.

In the case that the LTE (or LTE-A) services are provided through the unlicensed band, coexistence with the communication nodes (e.g., access points, stations, etc.) supporting the WLAN is needed. For the coexistence in the unlicensed band, a communication node (e.g., base station, UE, etc.) supporting the LTE (or LTE-A) may occupy the unlicensed band based on an LBT (listen before talk) scheme. In this case, the communication node supporting the LTE (or LTE-A, etc.) may not be able to transmit a signal at a desired point in time. That is, unlike the communication node supporting the license band, the communication node supporting the unlicensed band may not transmit a signal at a desired point in time. Accordingly, there is a need for methods for scheduling uplink transmissions based on limited transmission opportunities in a communication network supporting an unlicensed band.

Meanwhile, this description on the related arts is written for understanding of the background of the present disclosure. Thus, information on other than conventional technologies, which are already known to those skilled in this technology domain to which the technologies of the present disclosure belong, may be included in this description.

DISCLOSURE

Technical Problem

The purpose of the present disclosure for resolving the above-described problem is to provide a method for scheduling uplink transmission in a communication network supporting an unlicensed band.

Technical Solution

An operation method of a terminal in a communication network according to an embodiment of the present disclosure for achieving the above-described purpose may comprise detecting a control channel of a subframe #n transmitted from the base station; receiving an uplink grant from the control channel; and transmitting a plurality of subframes scheduled by the uplink grant to the base station. The plurality of subframes include subframes #(n+l+k) to #(n+l+k+($N_{SF}$−1)), n is an integer equal to or greater than 0, l is an integer equal to or greater than 4, k indicating a scheduling delay offset is an integer equal to or greater than 0, and $N_{SF}$ is a number of the plurality of subframes.

Here, a request for activating a receiving function of the uplink grant may be received from the base station through a higher layer signaling.

Here, a maximum number of subframes scheduled by the uplink grant may be received from the base station through a higher layer signaling.

Here, the plurality of subframes scheduled by the uplink grant may be consecutive in time domain.

Here, the uplink grant may include at least one of k, $N_{SF}$, and i, and i indicates an index of each of the plurality of subframes, which is one of 0, 1, . . . , ($N_{SF}$−1).

Here, the uplink grant may include a starting position of a physical uplink shared channel (PUSCH) included in each of the plurality of subframes, or a starting position of a PUSCH included in a first subframe of the plurality of subframes.

Here, the starting position may be a single carrier-frequency division multiple access (SC-FDMA) symbol #0 among a plurality of SC-FDMA symbols included in a subframe, a specific time in the SC-FDMA symbol #0, or a SC-FDMA symbol #1.

Here, the uplink grant may include an ending position of each of the plurality of subframes, or an ending position of a last subframe of the plurality of subframes.

Here, the ending position may be a last SC-FDMA symbol among a plurality of SC-FDMA symbols included in a subframe or a SC-FDMA symbol prior to the last SC-FDMA symbol.

Here, the uplink grant may include a type of a channel access procedure to be performed by the terminal before transmission of the plurality of subframes.

Here, when the type indicates a type 1, the plurality of subframes may be transmitted when a channel status is determined to be in an idle state for a period corresponding to a backoff selected within a contention window.

Here, the contention window may be set variably according to a channel access priority.

Here, when the type indicates a type 2, the plurality of subframes may be transmitted when a channel status is determined to be in an idle state for a preconfigured period.

Here, the uplink grant may include a common field and individual fields, the common field may include information commonly used for the plurality of subframes, and each of the individual fields may include different information used for each of the plurality of subframes.

Here, the uplink grant may include a new data indicator (NDI) and a redundancy version (RV) for each of the plurality of subframes.

Here, the uplink grant may include a hybrid automatic repeat request (HARQ) process number of a first subframe of the plurality of subframes, and at least one HARQ process number of at least one remaining subframe excluding the first subframe among the plurality of subframes may be determined according to the HARQ process number of the first subframe and increase of a subframe number.

Here, the uplink grant may include a sounding reference signal (SRS) index indicating a subframe number of a subframe in which a SRS is transmitted.

An operation method of a base station in a communication network according to another embodiment of the present disclosure for achieving the above-described purpose may comprise generating an uplink grant; transmitting a downlink control information (DCI) including the uplink grant to a terminal through a subframe #n; and receiving a plurality of subframes scheduled by the uplink grant from the terminal. The plurality of subframes include subframes #(n+l+k) to #(n+l+k+($N_{SF}$−1)), n is an integer equal to or greater than 0, l is an integer equal to or greater than 4, k indicating a scheduling delay offset is an integer equal to or greater than 0, and $N_{SF}$ is a number of the plurality of subframes.

Here, a request for activating a receiving function of the uplink grant may be transmitted to the terminal through a higher layer signaling.

Here, a maximum number of subframes scheduled by the uplink grant may be transmitted to the terminal through a higher layer signaling.

Here, the plurality of subframes scheduled by the uplink grant may be consecutive in time domain.

Here, the uplink grant may include at least one of k, $N_{SF}$, and i, and i indicates an index of each of the plurality of subframes, which is one of 0, 1, . . . , ($N_{SF}$−1).

Here, the uplink grant may include a starting position of a physical uplink shared channel (PUSCH) included in each of the plurality of subframes, or a starting position of a PUSCH included in a first subframe of the plurality of subframes.

Here, the starting position may be a single carrier-frequency division multiple access (SC-FDMA) symbol #0 among a plurality of SC-FDMA symbols included in a subframe, a specific time in the SC-FDMA symbol #0, or a SC-FDMA symbol #1.

Here, the uplink grant may include an ending position of each of the plurality of subframes, or an ending position of a last subframe of the plurality of subframes.

Here, the ending position may be a last SC-FDMA symbol among a plurality of SC-FDMA symbols included in a subframe or a SC-FDMA symbol prior to the last SC-FDMA symbol.

Here, the uplink grant may include a type of a channel access procedure to be performed by the terminal before transmission of the plurality of subframes.

Here, when the type indicates a type 1, the plurality of subframes may be received from the terminal when a channel status is determined to be in an idle state for a period corresponding to a backoff selected within a contention window.

Here, the contention window may be set variably according to a channel access priority.

Here, when the type indicates a type 2, the plurality of subframes may be received from the terminal when a channel status is determined to be in an idle state for a preconfigured period.

Here, the uplink grant may include a common field and individual fields, the common field may include information commonly used for the plurality of subframes, and each of the individual fields may include different information used for each of the plurality of subframes.

Here, the uplink grant may include a new data indicator (NDI) and a redundancy version (RV) for each of the plurality of subframes.

Here, the uplink grant may include a hybrid automatic repeat request (HARQ) process number of a first subframe of the plurality of subframes, and at least one HARQ process number of at least one remaining subframe excluding the first subframe among the plurality of subframes may be determined according to the HARQ process number of the first subframe and increase of a subframe number.

Here, the uplink grant may include a sounding reference signal (SRS) index indicating a subframe number of a subframe in which a SRS is transmitted.

Advantageous Effects

According to the present invention, uplink transmission scheduling can be efficiently performed in a communication network supporting an unlicensed band, thereby improving uplink transmission efficiency. Thus, the performance of the communication network can be improved.

MODE FOR INVENTION

Figure 1:
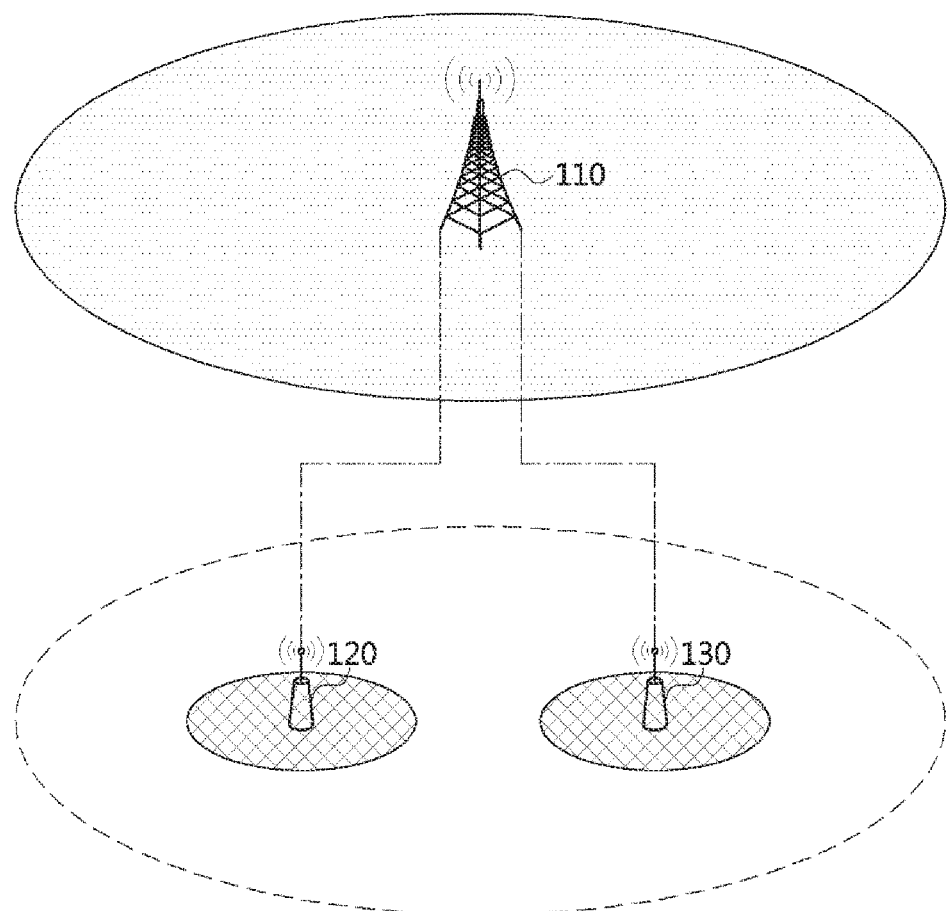
FIG. 1 is a conceptual diagram illustrating a first embodiment of a wireless communication network.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Hereinafter, wireless communication networks to which exemplary embodiments according to the present disclosure will be described. However, wireless communication networks to which exemplary embodiments according to the present disclosure are applied are not restricted to what will be described below. That is, exemplary embodiments according to the present disclosure may be applied to various wireless communication networks.

FIG. 1 is a conceptual diagram illustrating a first embodiment of a wireless communication network.

Referring to FIG. 1, a first base station 110 may support cellular communications (e.g., Long Term Evolution (LTE), LTE-Advanced (LTE-A), Licensed Assisted Access (LAA), etc.) standardized in a 3rd Generation Partnership Project (3GPP). The first base station 110 may support technologies such as a Multiple Input Multiple Output (MIMO) (e.g., Single-User (SU)—MIMO, Multi-User (MU)—MIMO, massive MIMO, etc.), a Coordinated multi-point transmission/reception (CoMP), a Carrier Aggregation (CA), etc. The first base station 110 may operate in a licensed band (F1), and form a macro cell. The first base station 100 may be connected to other base stations (e.g., a second base station 120, a third base station 130, etc.) through ideal backhaul links or non-ideal backhaul links.

The second base station 120 may be located in coverage of the first base station 110. Also, the second base station 120 may operate in an unlicensed band F3, and form a small cell. The third base station 130 may also be located in coverage of the first base station 110. The third base station 130 may operate in the unlicensed band F3, and form a small cell. The second base station 120 and the third base station 130 each may support a Wireless Local Area Network (WLAN)

standardized in an Institute of Electrical and Electronics Engineers (IEEE) 802.11. Each user equipment (UE) connected to the first base station 110 may transmit and receive signals through a CA using the licensed band F1 and the unlicensed band F3.

Figure 2:
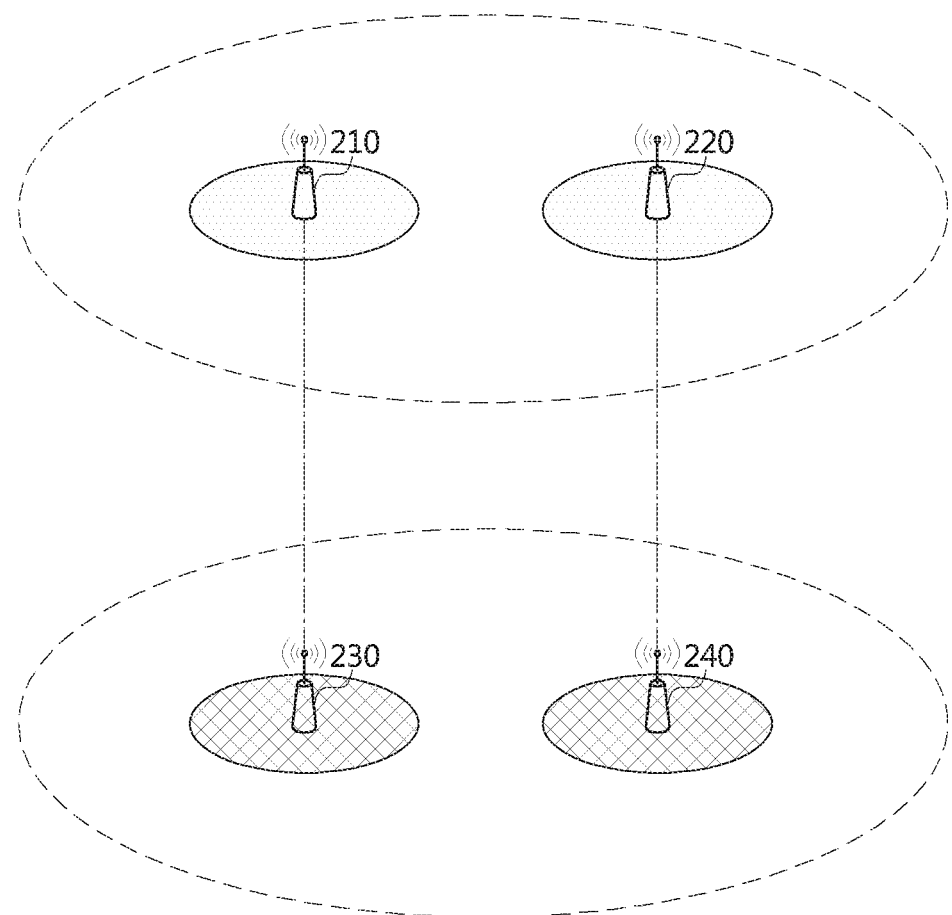
FIG. 2 is a conceptual diagram illustrating a second embodiment of a wireless communication network.

FIG. 2 is a conceptual diagram illustrating a second embodiment of a wireless communication network.

Referring to FIG. 2, each of a first base station 210 and a second base station 220 may support cellular communications (e.g., LTE, LTE-A, LAA, etc.). Each of the first base station 210 and the second base station 220 may support MIMO (e.g. SU-MIMO, MU-MIMO, massive MIMO, etc.), CoMP, CA, etc. Also, each of the base stations 210 and 220 may operate in the licensed band F1, and form each small cell. Each of the base stations 210 and 220 may be located in coverage of a base station forming a macro cell. The first base station 210 may be connected with a third base station 230 through an ideal backhaul link or a non-ideal backhaul link. Also, the second base station 220 may be connected with a fourth base station 240 through an ideal backhaul link or a non-ideal backhaul link.

The third base station 230 may be located in coverage of the first base station 210. The third base station 230 may operate in the unlicensed band F3, and form a small cell. The fourth base station 240 may be located in coverage of the second base station 220. The fourth base station 240 may operate in the unlicensed band F3, and form a small cell. Each of the base stations 230 and 240 may support WLAN standardized in IEEE 802.11. Each of the first base station 210, a UE connected to the first base station 210, the second base station 220, and a UE connected to the second base station 220 may transmit and receive signals through a CA using the licensed band F1 and the unlicensed band F3.

Figure 3:
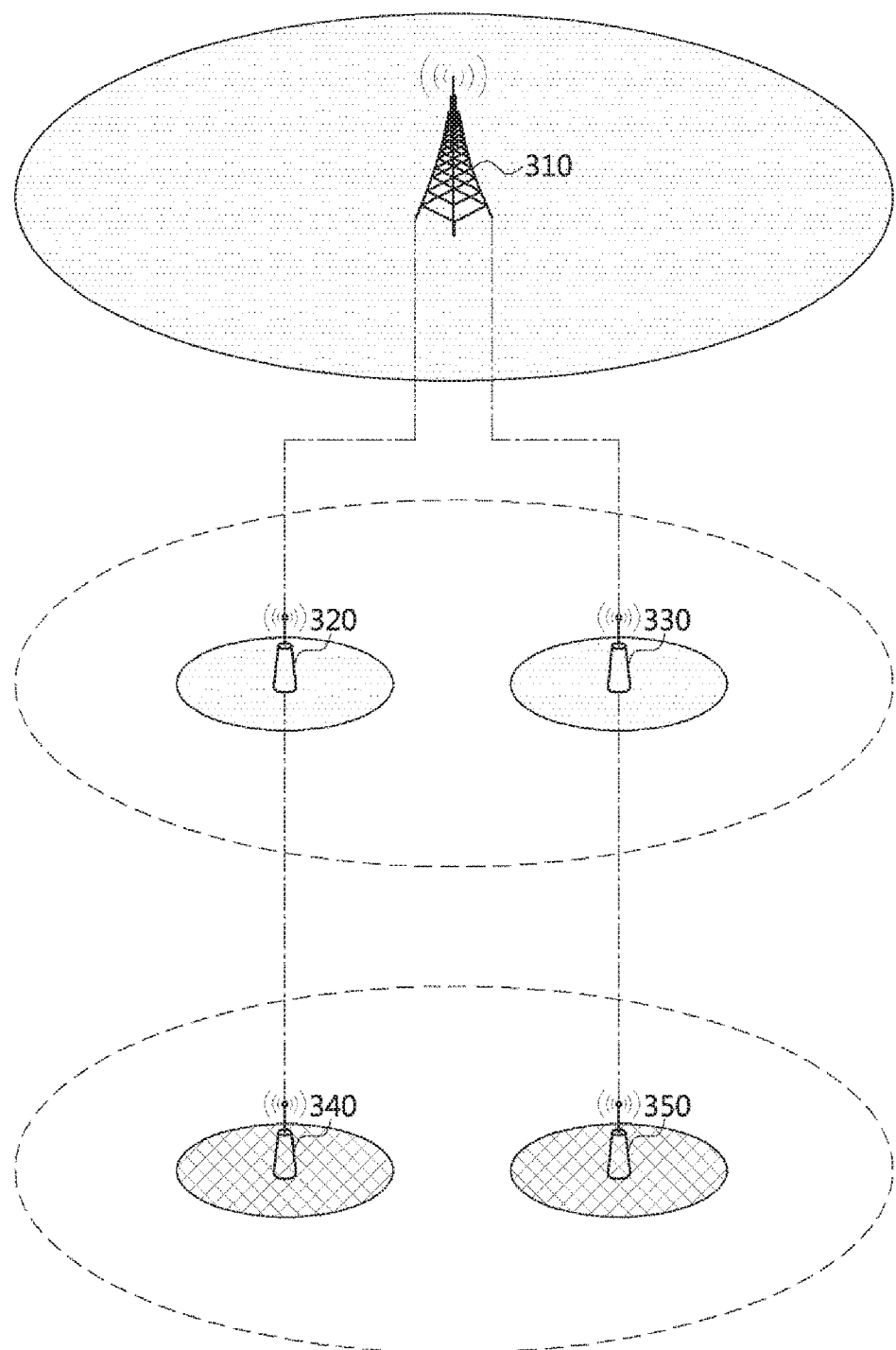
FIG. 3 is a conceptual diagram illustrating a third embodiment of a wireless communication network.

FIG. 3 is a conceptual diagram illustrating a third embodiment of a wireless communication network.

Referring to FIG. 3, each of a first base station 310, a second base station 320, and a third base station 330 may support cellular communications (e.g., LTE, LTE-A, LAA, etc.). Each of the first base station 310, the second base station 320, and the third base station 330 may support MIMO (e.g., SU-MIMO, MU-MIMO, massive MIMO, etc.), CoMP, CA, etc. The first base station 310 may operate in the licensed band F1, and form a macro cell. The first base station 310 may be connected to other base stations (e.g., the second base station 320, the third base station 330, etc.) through ideal backhaul links or non-ideal backhaul links. The second base station 320 may be located in coverage of the first base station 310. The second base station 320 may operate in the licensed band F1, and form a small cell. The third base station 330 may be located in coverage of the first base station 310. The third base station 330 may operate in the licensed band F1, and form a small cell.

The second base station 320 may be connected with a fourth base station 340 through an ideal backhaul link or a non-ideal backhaul link. The fourth base station 340 may be located in coverage of the second base station 320. The fourth base station 340 may operate in the unlicensed band F3, and form a small cell. The third base station 330 may be connected with a fifth base station 350 through an ideal backhaul link or a non-ideal backhaul link. The fifth base station 350 may be located in coverage of the third base station 330. The fifth base station 350 may operate in the unlicensed band F3, and form a small cell. Each of the base stations 340 and 350 may support WLAN standardized in IEEE 802.11.

Each of the first base station 310, a UE (not-depicted) connected to the first base station 310, the second base station 320, a UE (not-depicted) connected to the second base station 320, the third base station 330, and a UE (not-depicted) connected to the third base station 330 may transmit and receive signals through a CA using the licensed band F1 and the unlicensed band F3.

Figure 4:
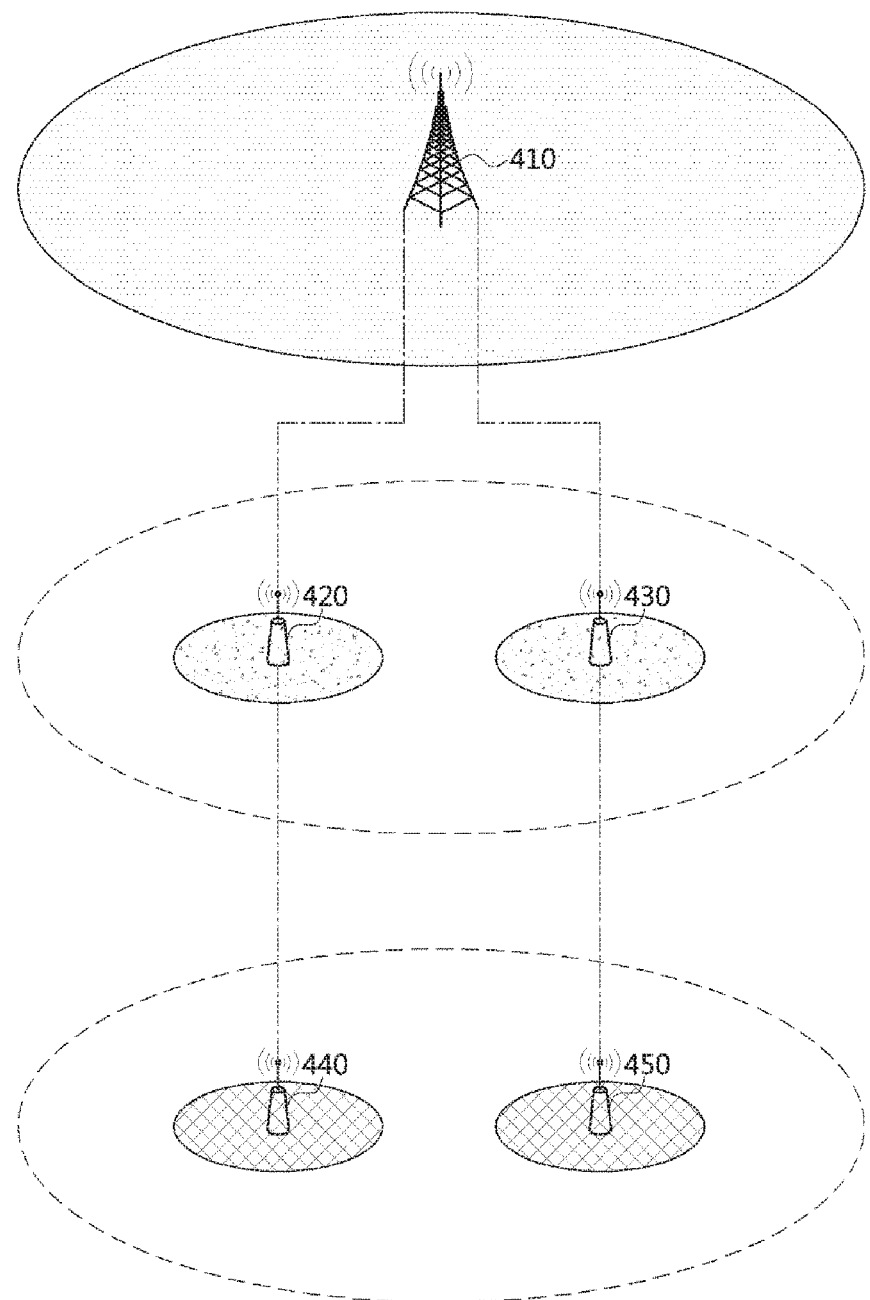
FIG. 4 is a conceptual diagram illustrating a fourth embodiment of a wireless communication network.

FIG. 4 is a conceptual diagram illustrating a fourth embodiment of a wireless communication network.

Referring to FIG. 4, each of a first base station 410, a second base station 420, and a third base station 430 may support cellular communications (e.g., LTE, LTE-A, LAA, etc.). Each of the first base station 410, the second base station 420, and the third base station 430 may support MIMO (e.g., SU-MIMO, MU-MIMO, massive MIMO, etc.), CoMP, CA, etc. The first base station 410 may operate in the licensed band F1, and form a macro cell. The first base station 410 may be connected to other base stations (e.g. the second base station 420, the third base station 430, etc.) through ideal backhaul links or non-ideal backhaul links. The second base station 420 may be located in coverage of the first base station 410. The second base station 420 may operate in the licensed band F2, and form a small cell. The third base station 430 may be located in coverage of the first base station 410. The third base station 430 may operate in the licensed band F2, and form a small cell. Each of the second base station 420 and the third base station 430 may operate in the licensed band F2 different from the licensed band F1 in which the first base station 410 operates.

The second base station 420 may be connected with a fourth base station 440 through an ideal backhaul link or a non-ideal backhaul link. The fourth base station 440 may be located in coverage of the second base station 420. The fourth base station 440 may operate in the unlicensed band F3, and form a small call. The third base station 430 may be connected with a fifth base station 450 through an ideal backhaul link or a non-ideal backhaul link. The fifth base station 450 may be located in coverage of the third base station 430. The fifth base station 450 may operate in the unlicensed band F3, and form a small cell. Each of the base stations 440 and 450 may support WLAN standardized in IEEE 802.11.

Each of the first base station 410 and a UE (not-depicted) connected to the first base station 410 may transmit and receive signals through a CA using the licensed band F1 and the unlicensed band F3. Each of the second base station 420, a UE (not-depicted) connected to the second base station 420, the third base station 430, and a UE (not-depicted) connected to the third base station 430 may transmit and receive signals through a CA using the licensed band F2 and the unlicensed band F3.

The above-described communication nodes constituting a wireless communication network (e.g., a base station, a UE, etc.) may transmit signals according to a Listen-Before-Talk (LBT) procedure in the unlicensed band. That is, the communication node may determine whether the unlicensed band is occupied or not by performing an energy detection operation. The communication node may transmit a signal when the unlicensed band is determined to be in an idle state. Here, the communication node may transmit a signal when the unlicensed band is maintained as in the idle state during a contention window according to a random backoff operation. On the contrary, when the unlicensed band is determined as a busy state, the communication node may not transmit a signal.

Alternatively, the communication entity may transmit a signal based on a Carrier Sensing Adaptive Transmission (CSAT) operation. That is, the communication node may transmit a signal based on a pre-configured duty cycle. The communication node may transmit a signal when a current duty cycle is a duty cycle assigned for communication nodes supporting cellular communications. On the contrary, the communication node may not transmit a signal when a current duty cycle is a duty cycle assigned for communication nodes supporting other communications (e.g., WALN, etc.) except cellular communications. The duty cycle may be determined adaptively based on the number of communication nodes existing and supporting WLAN in the unlicensed band, a usage state of the unlicensed band, etc.

The communication node may perform discontinuous transmission in the unlicensed band. For example, if a maximum transmission duration or a maximum channel occupancy time is configured for the unlicensed band, the communication node may transmit signals during the maximum transmission duration or the maxim channel occupancy time. In a case that the communication node cannot transmit whole signals during the current maximum transmission duration (or, maximum channel occupancy time), the communication node may transmit the rest of signals in a next maximum transmission duration. Also, the communication node may select a carrier having relatively smaller interferences among unlicensed bands, and operate in the selected carrier. Also, in the case that the communication node transmits signals in the unlicensed band, transmission power can be controlled in order to reduce interferences to other communication nodes.

On the other hand, the communication node may support communication protocols based on code division multiple access (CDMA), wideband CDMA (WCDMA), time division multiple access (TDMA), frequency division multiple access (FDMA), single carrier FDMA (SC-FDMA), orthogonal frequency division multiplexing (OFDM), or orthogonal frequency division multiple access (OFDMA).

A base station among communication nodes may be referred to as a Node-B (NB), an evolved Node-B (eNB), a base transceiver station (BTS), a radio base station, a radio transceiver, an access point (AP), or an access node. Also, a user equipment (UE) among communication nodes may be referred to as a terminal, an access terminal, a mobile terminal, a station, a subscriber station, a portable subscriber station, a mobile station, a node, or a device. The communication node may have a structure which will be described below.

Figure 5:
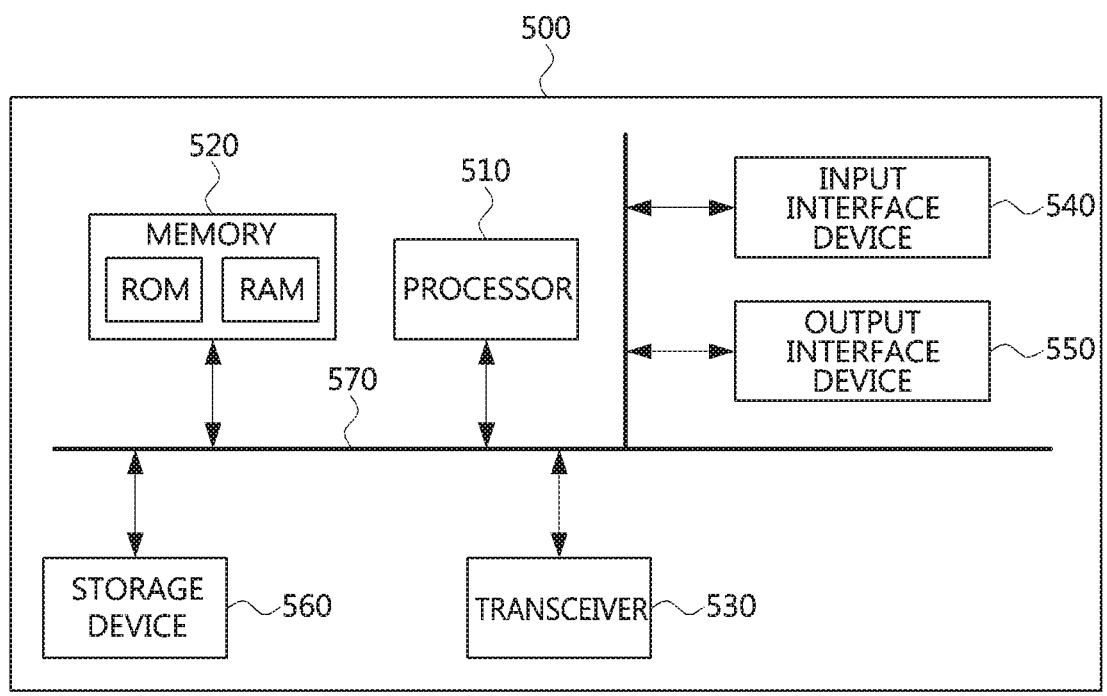
FIG. 5 is a block diagram illustrating an embodiment of a communication node constituting a wireless communication network.

FIG. 5 is a block diagram illustrating an embodiment of a communication node constituting a wireless communication network.

Referring to FIG. 5, a communication node 500 may include at least one processor 510, a memory 520 and a transceiver 530 connected to a network and performing communication. Further, the communication node 500 may include an input interface unit 540, an output interface unit 550, and a storage 560. The respective components included in the communication node 500 may be connected via a bus 570 to communicate with each other.

The processor 510 may perform a program command stored in the memory 520 and/or the storage 560. The processor 510 may be a central processing unit (CPU), a graphics processing unit (GPU) or a dedicated processor in which the methods according to embodiments of the present disclosure are performed. The memory 520 and the storage 560 may include a volatile storage medium and/or a non-volatile storage medium. For example, the memory 520 may include a read only memory (ROM) and/or a random access memory (RAM).

Operation methods of the communication node in the wireless communication network will be described below.

Although a method (e.g., signal transmission or reception) performed by a first communication node will be described, a second communication node corresponding thereto may perform a method (e.g., signal reception or transmission) corresponding to the method performed by the first communication node. That is, when an operation of the UE is described, the base station corresponding thereto may perform an operation corresponding to the operation of the UE. On the contrary, when an operation of the base station is described, the UE may perform an operation corresponding to an operation of the base station.

Meanwhile, a carrier aggregation may be applied to at least one of unlicensed band cells and at least one of licensed band cells. Configuration, addition, modification, or release of the unlicensed band cell may be performed through a radio resource control (RRC) signaling (e.g., transmission and reception of 'RRCConnectionReconfiguration' messages (hereinafter, referred to as a 'RRC message')). The RRC message may be transmitted to a UE through the licensed band cell, and may include information required for management and operation of the unlicensed band cell.

Unlike the licensed band cell, the period in which a signal can be continuously transmitted in the unlicensed band cell may be limited within the maximum transmission duration. Further, when a signal is transmitted based on the LBT, the signal may be transmitted when transmission of another communication node is completed. In the case that LTE (or, LTE-A) services are provided in the unlicensed band cell, transmission of communication nodes supporting the LTE (or LTE-A) may have aperiodic, discontinuous, opportunistic characteristics. Based on these characteristics, a signal transmitted continuously by a communication node supporting the LTE (or LTE-A) for a certain time period in the unlicensed band may be referred to as 'unlicensed band burst'.

Also, a contiguous set of subframes consisting of a combination of at least one of a channel defined in the licensed band (e.g., a physical control format indicator channel (PCFICH), a physical hybrid automatic repeat request (ARQ) indicator channel (PHICH), a physical downlink control channel (PDCCH), a physical multicast channel (PMCH), a physical uplink control channel (PUCCH), a physical uplink shared channel (PUSCH), etc.) and a signal (e.g., a synchronization signal, a reference signal, etc.) may be transmitted over the unlicensed band. In this case, transmission of the subframes may be referred to as 'unlicensed band transmission'.

Frames used for the transmission in the unlicensed band may be classified into a downlink (DL) unlicensed band burst frame, an uplink (UL) unlicensed band burst frame, and a UL/DL unlicensed band burst frame. The DL unlicensed band burst frame may include a subframe to which the unlicensed band transmission is applied, and may further include an 'unlicensed band signal'. In the DL unlicensed band burst frame, the unlicensed band signal may be located before the subframe to which the unlicensed band transmission is applied. The unlicensed band signal may be configured to match a timing of a subframe (or a timing of an OFDM symbol) to which the unlicensed band transmission is applied to a timing of a subframe (or a timing of an OFDM symbol) in the licensed band. Also, the unlicensed band signal may be used for automatic gain control (AGC), synchronization acquisition, channel estimation, etc. required for reception of data based on the unlicensed band transmission.

Meanwhile, the cellular communication network (e.g. LTE network) may support frequency division duplexing (FDD) or time division duplexing (TDD). A frame based on FDD may be defined as a type 1 frame, and a frame based on TDD may be defined as a type 2 frame.

Figure 6:
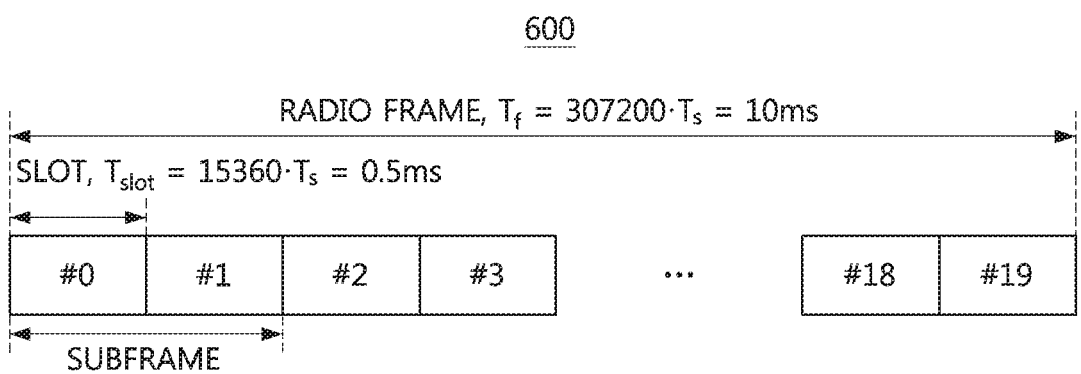
FIG. 6 is a conceptual diagram illustrating an embodiment of a type 1 frame.

FIG. 6 is a conceptual diagram illustrating an embodiment of a type 1 frame.

Referring to FIG. 6, a radio frame 600 may comprise 10 subframes, and each subframe may comprise two slots. Thus, the radio frame 600 may comprise 20 slots (e.g. slot #0, slot #1, slot #2, slot #3, . . . , slot #18, and slot #19). The length ($T_f$) of the radio frame 600 may be 10 milliseconds (ms). Also, the length of each subframe may be 1 ms. Also, the length ($T_{slot}$) of each slot may be 0.5 ms. Here, Ts may be 1/30,720,000 second.

Each slot may comprise a plurality of OFDM symbols in time domain, and comprise a plurality of resource blocks (RBs) in frequency domain. Each resource block may comprise a plurality of subcarriers in frequency domain. The number of OFDM symbols constituting each slot may be determined according to configuration of a cyclic prefix (CP). The CP may be classified into a normal CP and an extended CP. If the normal CP is used, each slot may comprise 7 OFDM symbols, and each subframe may comprise 14 OFDM symbols. If the extended CP is used, each slot may comprise 6 OFDM symbols, and each subframe may comprise 12 OFDM symbols.

Figure 7:
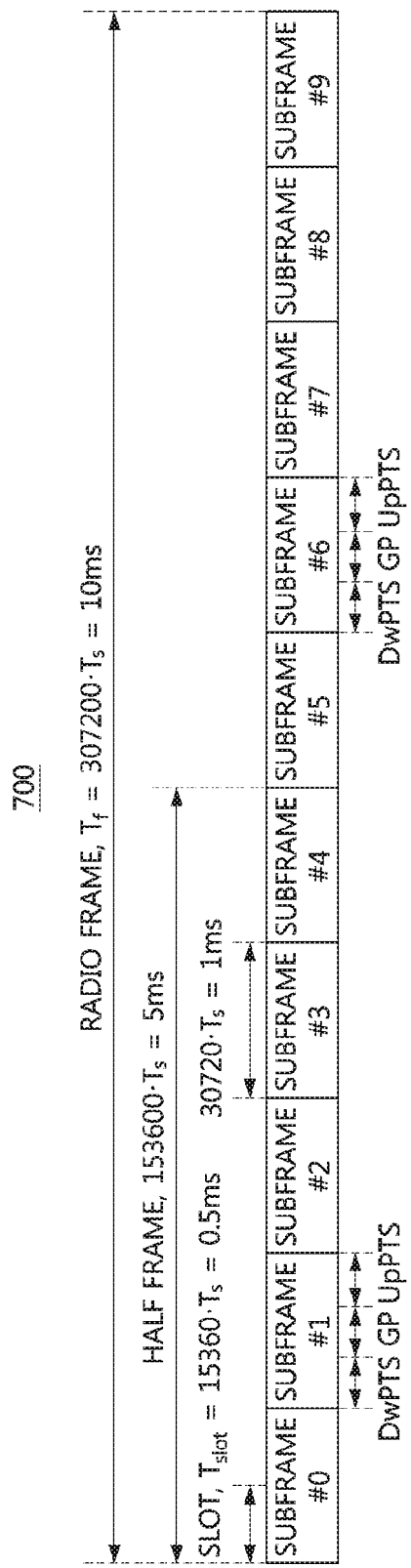
FIG. 7 is a conceptual diagram illustrating an embodiment of a type 2 frame.

FIG. 7 is a conceptual diagram illustrating an exemplary embodiment of a type 2 frame.

Referring to FIG. 7, a radio frame 700 may comprise two half frames, and each half frame may comprise 5 subframes. Thus, the radio frame 700 may comprise 10 subframes. The length ($T_f$) of the radio frame 700 may be 10 ms, and the length of each half frame may be 5 ms. The length of each subframe may be 1 ms. Here, $T_s$ may be 1/30,720,000 second.

The radio frame 700 may include at least one downlink subframe, at least one uplink subframe, and at least one special subframe. Each of the downlink subframe and the uplink subframe may comprise two slots. The length (Tslot) of each slot may be 0.5 ms. Each of subframe #1 and subframe #6, among subframes constituting the radio frame 700, may be a special subframe. Each special subframe may include a downlink pilot time slot (DwPTS), a guard period (GP), and an uplink pilot time slot (UpPTS).

The numbers and positions of the downlink subframes, the uplink subframes, and the special subframes included in the radio frame 700 may be changed as needed. The 'uplink-downlink (UL-DL) configuration' for 10 subframes included in the radio frame 700 may be set based on Table 1. In Table 1, 'D' may indicate a downlink subframe, may indicate an uplink subframe, and 'S' may indicate a special subframe.

TABLE 1

| UL-DL configuration | UL-DL switching cycle | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The DwPTS may be regarded as being included in a downlink period and may be used for UE cell search, time and frequency synchronization acquisition, and the like. A PDSCH, a PDCCH, a primary synchronization signal (PSS), a reference signal, and the like may be transmitted in the DwPTS identically or similarly to the general downlink subframe.

The GP may be used for resolving interference problem of uplink data transmission caused by downlink data reception delay. Also, the GP may include a time required for switching from a downlink data reception operation to an uplink data transmission operation. The UpPTS may be regarded as being included an uplink period and may be used for uplink channel estimation, time and frequency synchronization acquisition, and the like. A physical random access channel (PRACH), a sounding reference signal (SRS), or the like may be transmitted in the UpPTS.

The lengths of the DwPTS, the GP, and the UpPTS included in the special subframe may be variably adjusted as needed. Table 2 may be an embodiment of the configuration of the special subframe (e.g., the configuration of the DwPTS and the UpPTS). A period excluding the DwPTS and the UpPTS in a subframe having a length of 1 ms may be set as the GP. In Table 2, $T_s$ may be a base time unit and may be set to 1/(15000×2048) seconds.

TABLE 2

| | Normal CP for DL | | | Extended CP for DL | | |
|---|---|---|---|---|---|---|
| | | UpPTS | | | UpPTS | |
| Special subframe configuration | DwPTS | Normal CP for UL | Extended CP for UL | DwPTS | Normal CP for UL | Extended CP for UL |
| 0 | 6592 $T_s$ | 2192 $T_s$ | 2560 $T_s$ | 7680 $T_s$ | 2192 $T_s$ | 2560 $T_s$ |
| 1 | 19760 $T_s$ | | | 20480 $T_s$ | | |
| 2 | 21952 $T_s$ | | | 23040 $T_s$ | | |
| 3 | 24144 $T_s$ | | | 25600 $T_s$ | 4384 $T_s$ | 5120 $T_s$ |
| 4 | 26336 $T_s$ | | | 7680 $T_s$ | | |
| 5 | 6592 $T_s$ | 4384 $T_s$ | 5120 $T_s$ | 20480 $T_s$ | | |
| 6 | 19760 $T_s$ | | | 23040 $T_s$ | | |
| 7 | 21952 $T_s$ | | | 12800 $T_s$ | | |
| 8 | 24144 $T_s$ | | | — | — | — |
| 9 | 13168 $T_s$ | | | — | — | — |

Table 3 below may be a configuration of a special subframe in a case where a normal CP is used for both the downlink and uplink in the special subframe configurations of Table 2. The numbers described in the 'DwPTS' field, 'GP' field, and 'UpPTS' field in Table 3 may indicate the number of OFDM symbols for each. For example, if a subframe includes 14 OFDM symbols and a 'special subframe configuration 0' in Table 3 is used, the special subframe may include a DwPTS comprising 3 OFDM symbols, a GP comprising 10 OFDM symbols, and an UpPTS including 1 OFDM symbol.

TABLE 3

| Special subframe configuration | Number of OFDM symbols | | |
| --- | --- | --- | --- |
| | DwPTS | GP | UpPTS |
| 0 | 3 | 10 | 1 |
| 1 | 9 | 4 | 1 |
| 2 | 10 | 3 | 1 |
| 3 | 11 | 2 | 1 |
| 4 | 12 | 1 | 1 |
| 5 | 3 | 9 | 2 |
| 6 | 9 | 3 | 2 |
| 7 | 10 | 2 | 2 |
| 8 | 11 | 1 | 2 |
| 9 | 6 | 6 | 2 |

Figure 8:
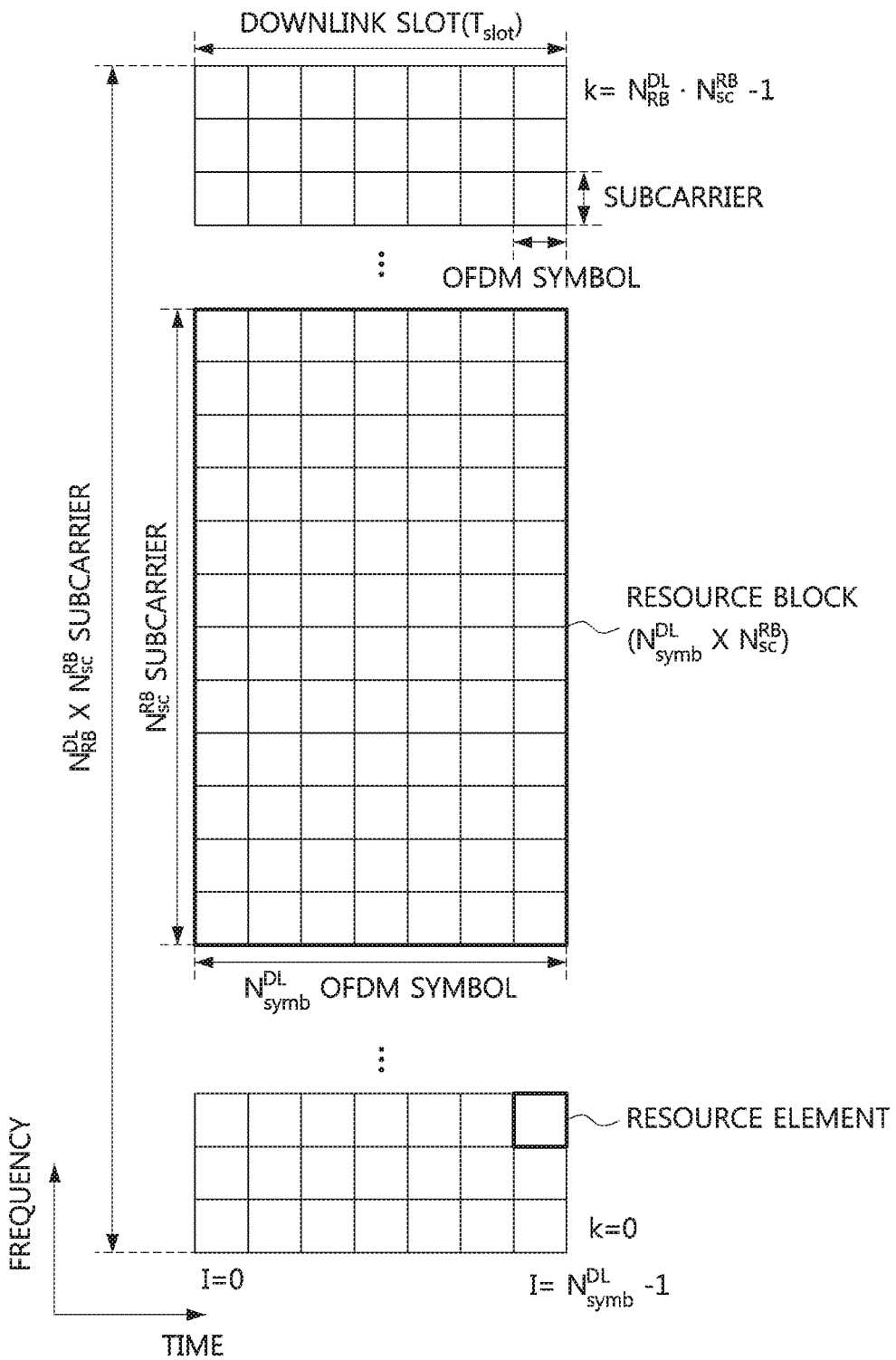
FIG. 8 is a conceptual diagram illustrating an embodiment of a resource grid of a slot included in a downlink subframe.

FIG. 8 is a conceptual diagram illustrating an embodiment of a resource grid of a slot included in a downlink subframe.

Referring to FIG. 8, 1 may indicate an OFDM symbol index, and k may indicate a subcarrier index. $N_{RB}^{DL}$ may indicate the number of resource blocks in the downlink. $N_{symb}^{DL}$ may indicate the number of OFDM symbols in a downlink slot (or resource block). $N_{SC}^{RB}$ may indicate the number of subcarriers in the resource block.

When the normal CP is used, each resource block (RB) of a slot included in a downlink subframe or an uplink subframe may comprise 7 OFDM symbols in time domain, and 12 subcarriers in frequency domain. In this case, a resource defined by a single OFDM symbol in time domain and a single subcarrier in frequency domain may be referred to as a resource element (RE).

In downlink transmission of a cellular communication network (e.g. LTE network), allocation of resources for a UE may be performed in unit of RBs, and mapping of reference signals and synchronization signals may be performed in unit of REs.

Figure 9:
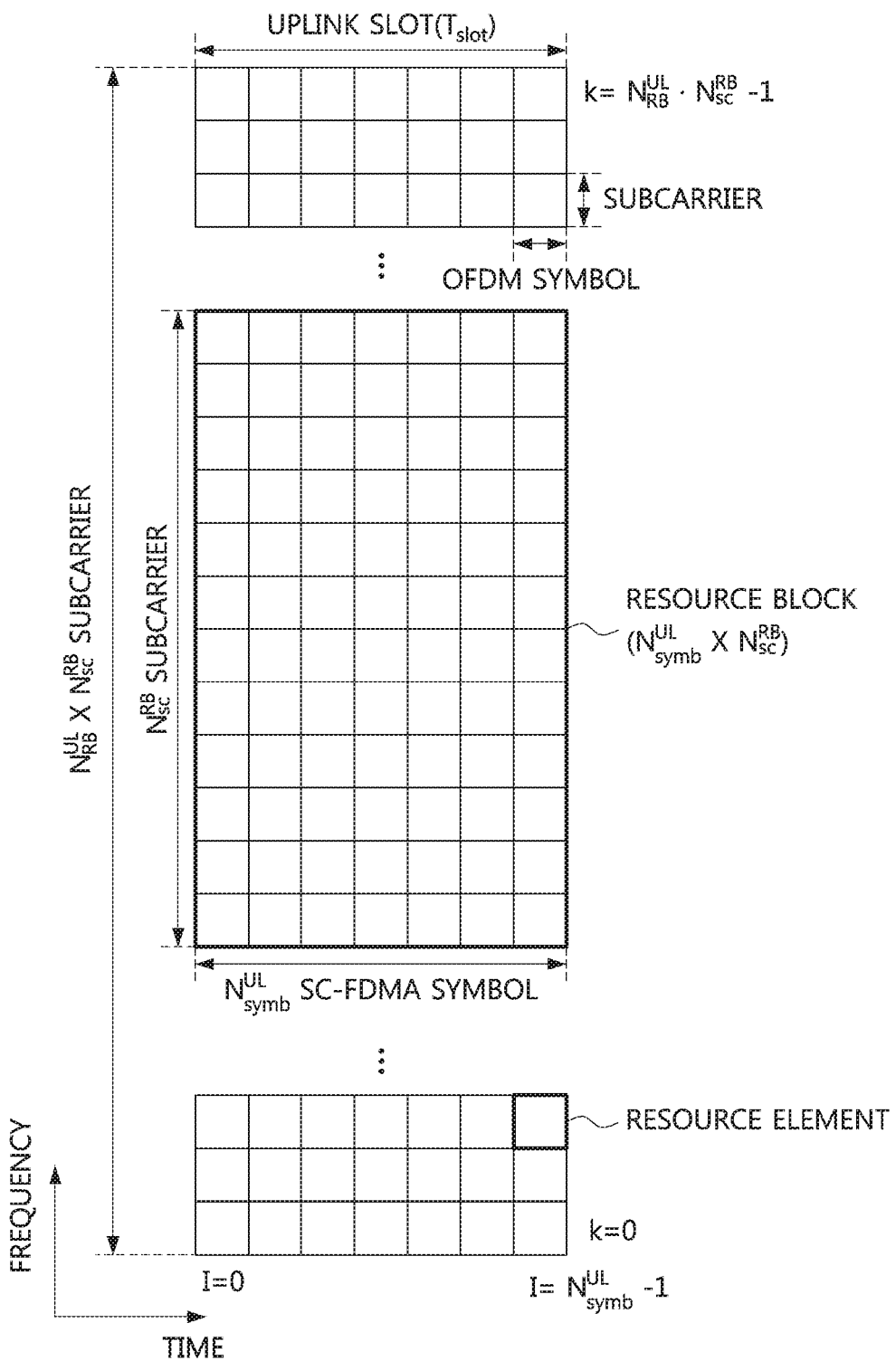
FIG. 9 is a conceptual diagram illustrating an embodiment of a resource grid of slots included in an uplink subframe.

FIG. 9 is a conceptual diagram illustrating an embodiment of a resource grid of slots included in an uplink subframe.

Referring to FIG. 9, 1 may indicate a single carrier-frequency division multiple access (SC-FDMA) symbol index and k may indicate a subcarrier index. $N_{RB}^{UL}$ may indicate the number of resource blocks in the uplink. $N_{symb}^{UL}$ may indicate the number of SC-FDMA symbols in an uplink slot (or resource block). $N_{SC}^{RB}$ may indicate the number of subcarriers in the resource block.

When the normal CP is used, the resource block included in the uplink subframe may include 7 SC-FDMA symbols in time domain and 12 subcarriers in frequency domain. In this case, a resource defined by a single SC-FDMA symbol in time domain and a single subcarrier in frequency domain may be referred to as a resource element (RE).

Figure 10:
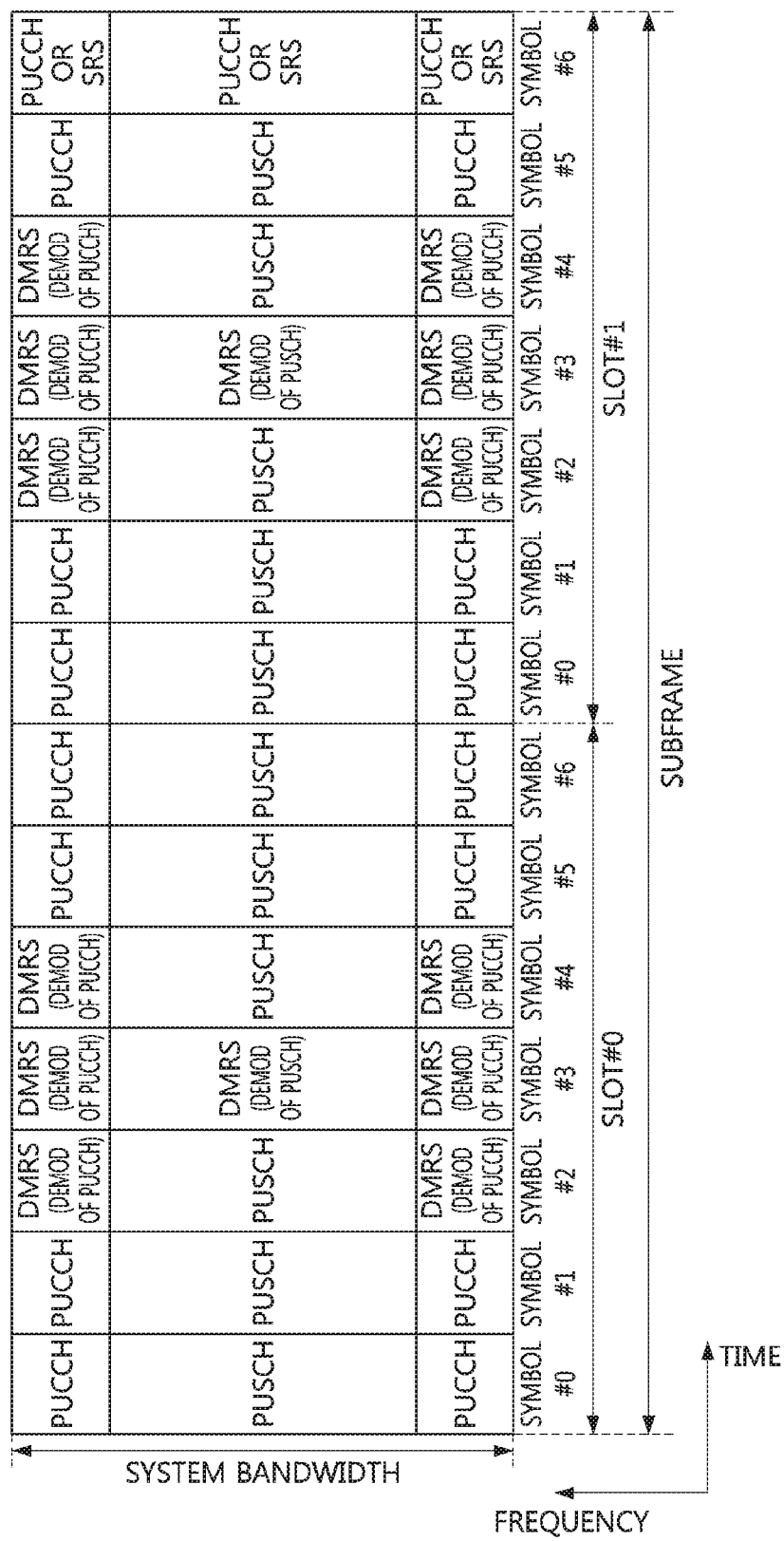
FIG. 10 is a conceptual diagram illustrating an embodiment of an uplink subframe configuration.

FIG. 10 is a conceptual diagram illustrating an embodiment of an uplink subframe configuration.

Referring to FIG. 10, when the normal CP is used, an uplink subframe may include 14 SC-FDMA symbols. The uplink subframe may include a PUCCH, a PUSCH, a demodulation reference signal (DMRS), an SRS, and the like. The DMRS and the SRS used for demodulating the PUCCH and the PUCCH may be transmitted through edge regions of the frequency domain of the uplink subframe. The resources (e.g., the number of resource blocks, the number of SC-FDMA symbols, the position of frequency resource, and the position of time resource) allocated to the DMRS and SRS used for demodulating PUCCH and the PUCCH may variable according to system configuration.

A DMRS, an SRS, and the like used for demodulating the PUSCH and the PUSCH may be transmitted through resources (e.g., resource blocks) to which the PUCCH is not allocated in the uplink subframe. For example, a DMRS used for demodulating PUSCH is configured in the middle SC-FDMA symbol for each slot (e.g., SC-FDMA symbol #3 in slot #0, SC-FDMA symbol #3 in slot #1). The SRS may be configured in the last SC-FDMA symbol of the subframe (e.g., SC-FDMA symbol #6 in slot #1). If the SRS is not configured in the SC-FDMA symbol #6 of the slot #1, the PUCCH and the PUSCH may be transmitted through the SC-FDMA symbol #6 of the slot #1.

Hereinafter, a frame (e.g., a radio frame, a subframe) in which downlink communication and uplink communication are performed in the same frequency band of the unlicensed band will be described. In an FDD communication network (e.g., a type 1 frame-based communication network) supporting the licensed band, downlink communication and uplink communication may be performed according to a frequency band irrespective of a subframe number. For example, a downlink communication may be performed through radio frames (e.g., subframes #0 to #9) in a downlink frequency band (e.g., frequency band #1), and uplink communication may be performed through radio frames (e.g., subframe #0 to subframe #9) in an uplink frequency band (e.g., frequency band #2).

In a TDD communication network (e.g., a type 2 frame-based communication network) supporting the licensed band, uplink communication may be performed through uplink subframes according to the UL-DL configuration, and downlink communication may be performed through downlink subframes according to the UL-DL configuration. For example, when the UL-DL configuration 0 of Table 1 is used, downlink communication may be performed through subframes #0 and #5, and uplink communication may be performed through subframes #2 to #4 and #7 to #9.

Meanwhile, since the unlicensed band can be shared by a plurality of users, it is difficult to use fixed uplink subframes and fixed downlink subframes based on the UL-DL configurations in Table 1. Therefore, in the communication network supporting the unlicensed band, the uplink subframes and the downlink subframes may be variably configured.

Figure 11:
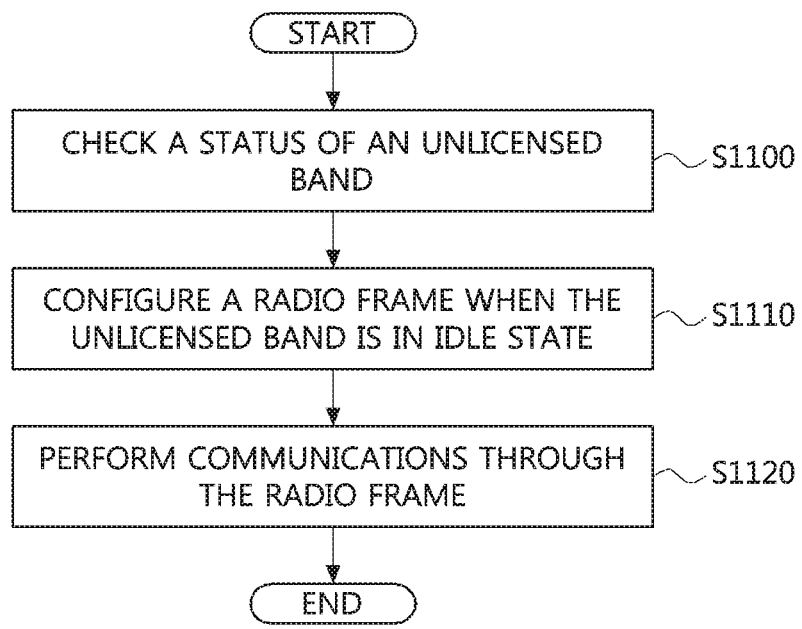
FIG. 11 is a flowchart showing an embodiment of a communication method based on a variable subframe configuration.

FIG. 11 is a flowchart showing an embodiment of a communication method based on a variable subframe configuration.

Referring to FIG. 11, a base station may be the base station shown in FIGS. 1 to 4, and a terminal may be connected to the base station. Each of the base station and the terminal may support cellular communications (e.g., LTE, LTE-A, LAA, eLAA, etc. defined in the 3GPP standard) and operate in the unlicensed band and the licensed band. Also, each of the base station and the terminal may be the same as or similar to the communication node 500 shown in FIG. 5.

The base station may check a status of a channel (e.g., unlicensed band) by performing a channel access procedure (e.g., an LBT procedure) (S1100). For example, the base station may select a backoff counter within a contention window and may identify the channel status (e.g., sense the channel) for a period corresponding to the selected backoff counter. Alternatively, the base station may identify the channel status (e.g., sense the channel) for a predetermined period (e.g., 25 µs or (25+timing advance (TA)) µs).

If it is determined that the channel status is an idle state, the base station may configure a radio frame including at least one of uplink subframe, downlink subframe, and special subframe (S1110). The length of the radio frame may be set to be less than a preset maximum length. The preset maximum length may be 10 ms. In the radio frame, the numbers of uplink subframes, downlink subframes, and special subframes may be respectively configured variably. The radio frame configured by the base station in the unlicensed band may be as follows.

Figure 12:
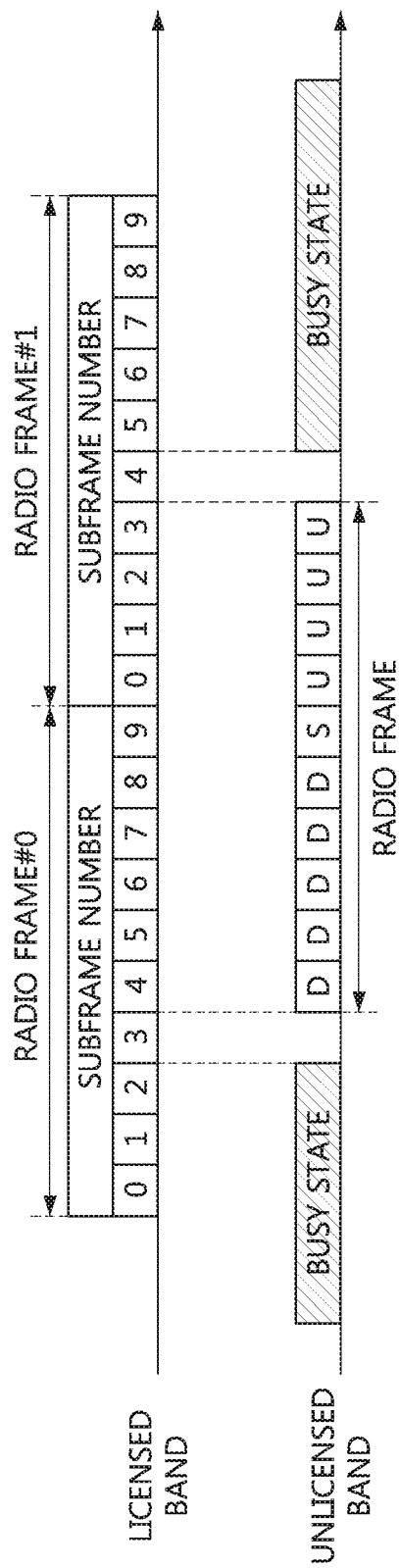
FIG. 12 is a conceptual diagram illustrating an embodiment of a radio frame in an unlicensed band.

FIG. 12 is a conceptual diagram illustrating an embodiment of a radio frame in an unlicensed band.

Referring to FIG. 12, since the channel status is a busy state in a period of an unlicensed band which corresponds to subframes #0 to #2 in a radio frame #0 of a licensed band, the base station may configure a radio frame after the busy state in the unlicensed band period. If the preset maximum length is 10 ms and the length of one subframe is 1 ms, the base station may configure a radio frame including 10 or fewer subframes. For example, a radio frame may include five downlink subframes, one special subframe, and four uplink subframes.

Referring again to FIG. 11, the base station may perform communications through the configured radio frame (S1120). For example, the base station may perform downlink communication through the downlink subframes in the unlicensed band and perform uplink communication through the uplink subframes in the licensed band.

Hereinafter, uplink scheduling methods in a communication network supporting a licensed band and an unlicensed band will be described. Here, an uplink subframe may include PUSCH. For example, an uplink subframe scheduled by an uplink grant may include PUSCH. The uplink grant may be classified into a single-uplink grant and a multi-uplink grant. The single-uplink grant may be an uplink grant for scheduling a signal uplink subframe (e.g., PUSCH). The multi-uplink grant may be an uplink grant for scheduling a plurality of uplink subframes (e.g., PUSCH).

A scheduling method based on the single-uplink grant may be as follows.

Figure 13:
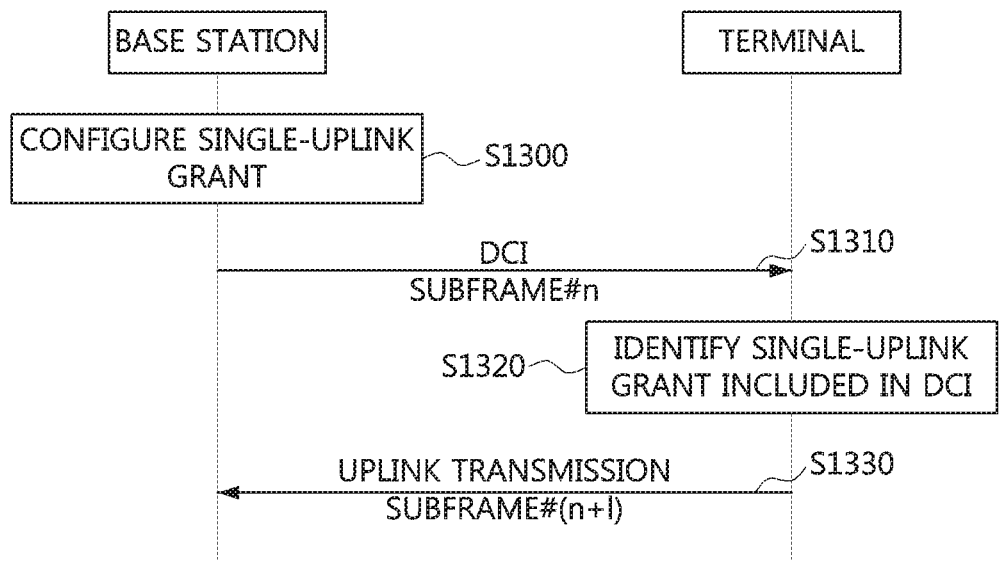
FIG. 13 is a sequence chart illustrating a first embodiment of a method for scheduling uplink transmission in a communication network.
Figure 14:
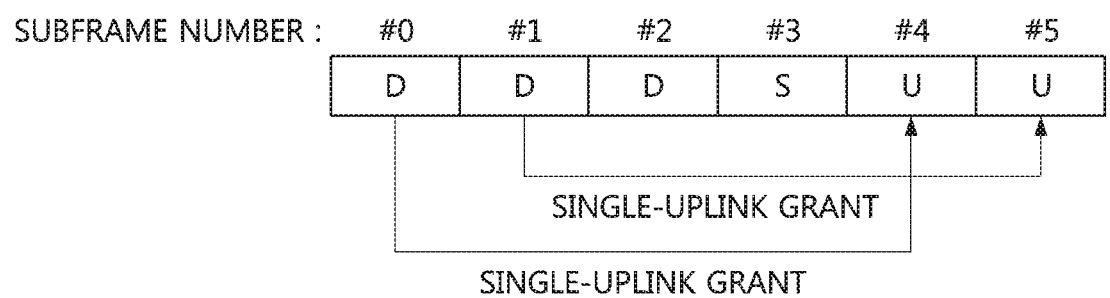
FIG. 14 is a conceptual diagram illustrating a first embodiment of a scheduled subframe in a communication network.

FIG. 13 is a sequence chart illustrating a first embodiment of a method for scheduling uplink transmission in a communication network, and FIG. 14 is a conceptual diagram illustrating a first embodiment of a scheduled subframe in a communication network.

Referring to FIGS. 13 and 14, a base station may be the base station shown in FIGS. 1 to 4, and the terminal may be connected to the base station. Each of the base station and the terminal may support cellular communications (e.g., LTE, LTE-A, LAA, eLAA, etc. defined in the 3GPP standard) and operate in the unlicensed band and the licensed band. Also, each of the base station and the terminal may be the same as or similar to the communication node 500 shown in FIG. 5.

The base station may configure a single-uplink grant (S1300). For example, when a message requesting uplink scheduling is received from a terminal, the base station may configure the single-uplink grant. The single-uplink grant may include at least one of the parameters described in Table 4. Also, the single-uplink grant may further include parameters as well as the parameters described in Table 4.

TABLE 4

| Parameter | Description |
| --- | --- |
| Carrier indicator | Carrier indicator for cross-carrier scheduling |
| Resource block assignment information | Assignment information of resource blocks used for uplink transmission |
| Modulation and coding scheme (MCS) | MCS level (or, index) used for uplink transmission |
| Cyclic shift information for DMRS | — |
| Orthogonal cover code (OCC) index | — |
| Transmit power control (TPC) command for scheduled PUSCH | — |
| SRS request | — |
| Channel state information (CSI) request | — |
| Hybrid automatic repeat request (HARQ) process number | — |
| Redundancy version (RV) | — |
| New data indicator (NDI) | — |

The base station may transmit a downlink control information (DCI) including the single-uplink grant (S1310). The DCI may be transmitted through at least one of PDCCH and enhanced PDCCH (EPDCCH). The DCI including the single-uplink grant may be transmitted through the subframe #n, and the single-uplink grant may schedule transmission of the subframe #(n+l). n may be an integer equal to or greater than zero. l may be preset in the base station and the terminal. The base station may inform l to the terminal through a higher layer signaling (e.g., RRC signaling). l may be an integer equal to or greater than 4. For example, the single-uplink grant transmitted through the subframe #0 may schedule transmission of the subframe #4, and the single-uplink grant transmitted through the subframe #1 may schedule transmission of the subframe #5.

The terminal may acquire the DCI by monitoring (or detecting) PDCCH and EPDCCH, and may identify the single-uplink grant included in the DCI (S1320). The terminal may identify that the transmission of the subframe #(n+l) is scheduled based on the parameters included in the single-uplink grant, and configure the subframe #(n+l) based on the parameters included in the single uplink grant. The terminal may transmit the subframe #(n+l) to the base station (S1330). For example, the terminal may transmit to the base station the subframe #4 scheduled by a single-uplink grant received through the subframe #0, and transmit to the base station the subframe #5 scheduled by a single-uplink grant received through the subframe #1.

The base station may receive the subframe #(n+l) from the terminal based on the parameters included in the single-uplink grant (e.g., the single-uplink grant transmitted via the subframe #n). For example, the base station may receive the subframe #4 from the terminal based on the parameters included in the single-uplink grant transmitted through the subframe #0, and may receive the subframe #5 from the terminal based on the parameters included in the single-uplink grant transmitted through the subframe #1.

Meanwhile, in case that an interval between the transmission time of the uplink grant and the transmission time of the uplink subframe scheduled by the uplink grant is set in advance, the transmission of the uplink grant may be matched with the transmission of the uplink subframe in a one-to-one manner at a preset interval. When a self-carrier scheduling scheme is used, the transmission of the uplink grant and the transmission of the uplink subframe scheduled by the uplink grant may be performed through the same carrier (i.e., the same carrier in the TDD communication network) or paired carriers (i.e., a pair of carriers in the FDD communication network). When a cross-carrier scheduling scheme is used, the carrier through which the uplink grant is transmitted may be different from the carrier through which the uplink subframe scheduled by the uplink grant is transmitted. The cross-carrier scheduling scheme may be used in a communication network supporting carrier aggregation.

In the FDD communication network supporting the licensed band, since a downlink carrier is configured separately from an uplink carrier, the transmission of the uplink grant may be matched with the transmission of the uplink subframe in a one-to-one manner. Also, in the TDD communication network supporting the licensed band, since the 'UL-DL subframe configuration' is defined in advance on the basis of Table 1, the transmission of the uplink grant may be matched with the transmission of the uplink subframe in a one-to-one manner.

On the other hand, in the communication network supporting the unlicensed band, due to uncertainty of channel use, a variable uplink-downlink subframe configuration, etc., the transmission of the uplink grant may be dynamically matched with the transmission of the uplink subframe scheduled by the uplink grant. When the self-carrier scheduling scheme is used in the communication network supporting the unlicensed band, the variable uplink-downlink subframe configuration may be difficult. For example, if the number of downlink subframes is smaller than the number of uplink subframes in a subframe burst (or radio frame) including a plurality of subframes, the use of the conventional uplink scheduling method may be limited.

Next, scheduling methods based on a multi-uplink grant will be described. The following scheduling methods may be performed based on the self-carrier scheduling scheme or the cross-carrier scheduling scheme.

Figure 15:
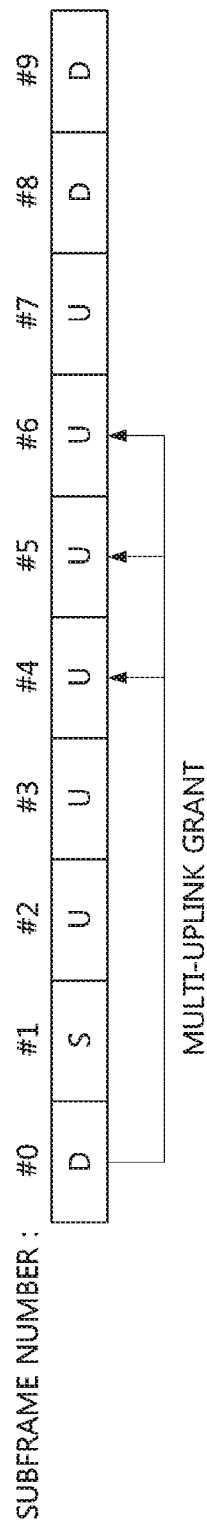
FIG. 15 is a conceptual diagram illustrating a second embodiment of a scheduled subframe in a communication network.

FIG. 15 is a conceptual diagram illustrating a second embodiment of a scheduled subframe in a communication network.

Referring to FIG. 15, in an unlicensed band, a radio frame may include 10 subframes. For example, a radio frame may comprise six uplink subframes, three downlink subframes, and one special subframe. The base station may generate a multi-uplink grant for scheduling the uplink subframes #4 to #6, and transmit the generated multi-uplink grant through the subframe #0.

Meanwhile, among the plurality of uplink subframes scheduled by the multi-uplink grant, the first uplink subframe in time domain may be referred to as a 'starting uplink subframe'. For example, the uplink subframe #4 may be a starting uplink subframe. Among the plurality of uplink subframes scheduled by the multi-uplink grant, the last uplink subframe in time domain may be referred to as an 'ending uplink subframe'. For example, the uplink subframe #6 may be an ending uplink subframe.

The multi-uplink grant may be classified into a 'multi-uplink grant type 1' and a 'multi-uplink grant type 2'.

1) Multi-Uplink Grant Type 1

When the multi-uplink grant type 1 is used, a multi-uplink grant that schedules each of a plurality of uplink subframes may be configured. For example, a multi-uplink grant A for scheduling the uplink subframe #4 may be configured, a multi-uplink grant B for scheduling the uplink subframe #5 may be configured, and a multi-uplink grant C for scheduling the uplink subframe #6 may be configured. In this case, each of the multi-uplink grants A, B, and C may be included in a different DCI. For example, the multi-uplink grant A may be included in a first DCI, the multi-uplink grant B may be included in a second DCI, and the multi-uplink grant C may be included in a third DCI. Also, each of the multi-uplink grants A, B, and C may be scrambled based on the same radio network temporary identifier (RNTI), and transmitted through the same subframe #0.

2) Multi-Uplink Grant Type 2

When the multi-uplink grant type 2 is used, a multi-uplink grant that schedules a plurality of uplink subframes may be configured. The multi-uplink grant may include one common field and a plurality of individual fields. For example, the multi-uplink grant may include a common field for the uplink subframes #4 to #6, an individual field A for the uplink subframe #4, an individual field B for the uplink subframe #5, and an individual field C for the uplink subframe #6.

The common field may include at least one parameter commonly used in the plurality of uplink subframes. For example, the common field may include resource block assignment information, an MCS, a transmit power control (TPC) command, and the like for the uplink subframes #4 to #6. The individual field may be configured for each of the plurality of uplink subframes and may include different parameters used for each of the plurality of uplink subframes. For example, each of the individual fields A, B, and C may include a HARQ process number, an RV, an NDI, and the like.

The scheduling method based on the above-described subframe structure (e.g., the subframe structure illustrated in FIG. 15) may be as follows.

Figure 16:
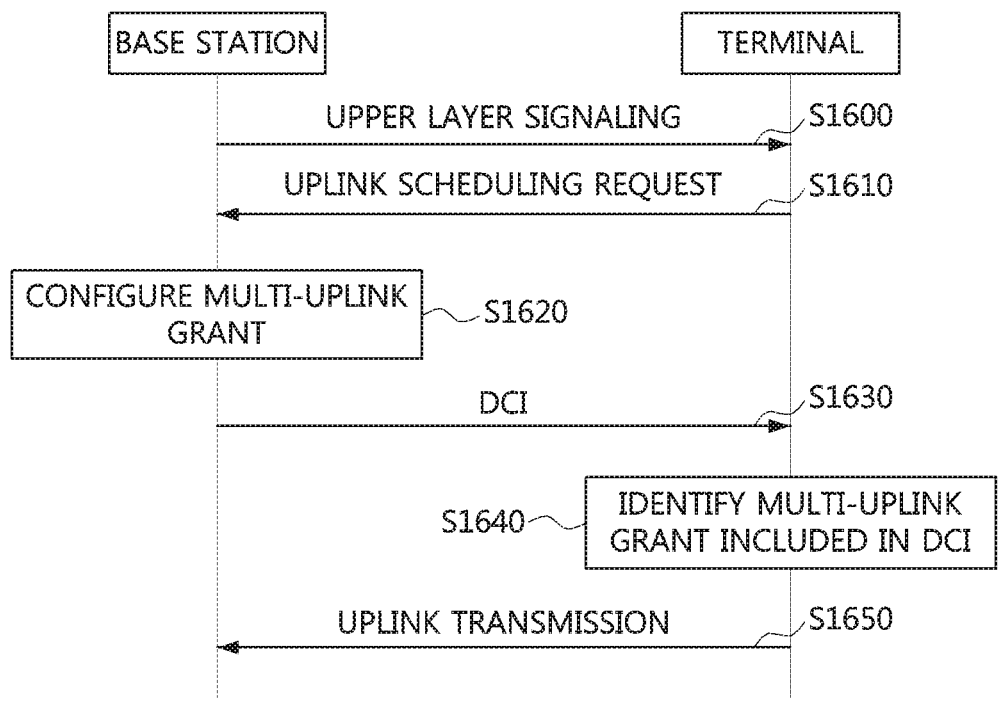
FIG. 16 is a sequence chart illustrating a second embodiment of a method for scheduling uplink transmission in a communication network.

FIG. 16 is a sequence chart illustrating a second embodiment of a method for scheduling uplink transmission in a communication network.

Referring to FIG. 16, a base station may be the base station shown in FIGS. 1 to 4, and the terminal may be connected to the base station. Each of the base station and the terminal may support cellular communications (e.g., LTE, LTE-A, LAA, eLAA, etc. defined in the 3GPP standard) and operate in the unlicensed band and the licensed band. Also, each of the base station and the terminal may be the same as or similar to the communication node 500 shown in FIG. 5.

The base station may inform the terminal of the scheduling of transmission of a plurality of uplink subframes by a multi-uplink grant through a higher layer signaling (e.g., RRC signaling) (S1600). The scheduling of the uplink transmission based on the multi-uplink grant may be necessary in a specific situation (e.g., when the number of uplink subframes is larger than the number of downlink subframes), and thus the step S1600 may be performed for this case.

Also, the base station may inform the terminal through a higher layer signaling (e.g., RRC signaling) of a multi-uplink grant type (e.g., type 1 or type 2), the maximum number of uplink subframes that can be scheduled by a multi-uplink grant, and the like. The maximum number of uplink subframes that can be scheduled by the multi-uplink grant may be referred to as '$M_{SF}$'. The $M_{SF}$ may be an integer greater than or equal to zero. For example, the $M_{SF}$ may be 4.

The terminal may identify that the transmission of a plurality of uplink subframes is scheduled by a multi-uplink grant through the higher layer signaling (e.g., RRC signaling). In this case, the terminal may activate a receiving function of the multi-uplink grant that schedules a plurality of uplink subframes. Also, the terminal may identify the multi-uplink grant type (e.g., type 1 or type 2), the $M_{SF}$, etc. through the higher layer signaling (e.g., RRC signaling).

Meanwhile, if the uplink transmission is required, the terminal may transmit to the base station a message requesting scheduling of uplink transmission to the base station (S1610). The message for requesting the scheduling of the uplink transmission may include an indicator indicating that the terminal supports the multi-uplink grant, the multi-uplink grant type, and the like. When the scheduling of the uplink transmission is requested from the terminal, the base station may configure an uplink grant (S1620). In case that the terminal supports the multi-uplink grant, the base station may configure the multi-uplink grant for scheduling the plurality of uplink subframes. Also, the base station may determine the type of the multi-uplink grant. In this case, the base station may determine the type of the multi-uplink grant according to a request of the terminal.

The number of uplink subframes scheduled by the multi-uplink grant may be equal to or less than the $M_{SF}$. The uplink subframes scheduled by the multi-uplink grant may be consecutive uplink subframes in time domain. For example, the consecutive uplink subframes #2 to #7 shown in FIG. 15 can be scheduled by a multi-uplink grant.

The multi-uplink grant may include at least one parameter described in Table 4 and Table 5. Also, the multi-uplink grant may further include necessary parameters as well as the parameters described in Table 4 and Table 5.

TABLE 5

| Parameter | Description |
| --- | --- |
| $N_{SF}$ | The number of uplink subframes scheduled by a multi-uplink grant |
| l | Interval between a transmission time of a multi-uplink grant (e.g., subframe #n) and a transmission time of a starting uplink subframe (e.g., subframe #(n + 1) |
| k | Scheduling delay offset from subframe #(n + 1) when a multi-uplink grant is transmitted via subframe #n |
| i | Index of each uplink subframe scheduled by a multi-uplink grant (e.g., i = 0, 1, . . . , ($N_{SF}$ − 1)) |
| Length information | starting position of uplink subframe ending position of uplink subframe |
| Channel access related information | An indicator indicating whether to perform a channel access procedure Channel access procedure type (type 1 or type 2) Execution time of channel access procedure |
| SRS index | Uplink subframe in which SRS is transmitted |

In FIG. 15, when the 'multi-uplink grant type 1' is used, a multi-uplink grant A for scheduling the uplink subframe #4 may be configured, and the multi-uplink grant A may include at least one of the parameters described in Table 4 and Table 5. A multi-uplink grant B for scheduling the uplink subframe #5 may be configured, and the multi-uplink grant B may include at least one of the parameters described in Table 4 and Table 5. A multi-uplink grant C for scheduling the uplink subframe #6 may be configured, and the multi-uplink grant C may include at least one of the parameters described in Table 4 and Table 5.

In FIG. 15, when the 'multi-uplink grant type 2' is used, a multi-uplink grant including a common field and a plurality of individual fields may be configured. The common field may include at least one parameter commonly used by the uplink subframes #4 to #6 among the parameters described in Table 4 and Table 5. Each of the individual fields may comprise different parameters used for each of the uplink subframes #4 to #6 among the parameters described in Table 4 and Table 5. An individual field A for the uplink subframe #4 may be configured, an individual field B for the uplink subframe #5 may be configured, and an individual field C for the uplink subframe #6 may be configured. For example, at least one of HARQ process number, RV, NDI, k, i, length information, channel access related information, and SRS index among the parameters described in Table 4 and Table 5 may be included in each of the individual fields A, B, and C. Among the parameters listed in Table 4 and Table 5, the remaining parameters (e.g., MCS, resource block assignment information, TPC command, etc.) except for the at least one parameter included in the individual field may be included in the common field. The types of parameters included in the common field and the individual fields of the multi-uplink grant are not limited to the above-described examples, and may be variously configured.

Then, when the 'multi-uplink grant type 1' or the 'multi-uplink grant type 2' is used, embodiments of the multi-uplink grant will be described.

HARQ Process Number

When the multi-uplink grant type 1 is used, a HARQ process number may be included in a multi-uplink grant. In FIG. 15, a HARQ process number of the uplink subframe #4 may be included in the multi-uplink grant A, a HARQ process number of the uplink subframe #5 may be included in the multi-uplink grant B, and a HARQ process number of the uplink subframe #6 may be included in the multi-uplink grant C. Therefore, the terminal may identify the HARQ process numbers of the uplink subframes #4 to #6 based on the multi-uplink grants A, B, and C, respectively.

Alternatively, only the HARQ process number of the starting uplink subframe (e.g., the uplink subframe #4) among the plurality of uplink subframes scheduled by the multi-uplink grant may be transmitted through the multi-uplink grant A, and the HARQ process numbers of the remaining uplink subframes (e.g., the uplink subframes #5 and #6) may not be transmitted through the corresponding uplink grant (e.g., the multi-uplink grants B and C). In this case, the terminal may identify the HARQ process number of the uplink subframe #4 based on the multi-uplink grant A, and deduce the HARQ process numbers of the remaining uplink subframes (e.g., the uplink subframes #5 and #6) using the HARQ process number of the starting uplink subframe (e.g., the uplink subframe #4).

The HARQ process number may increase according to the increase of the uplink subframe number, and when the HARQ process number of the uplink subframe #4 obtained through the multi-uplink grant A is x, the HARQ process number of the uplink subframe #5 may be deduced to be (x+1), and the HARQ process number of the uplink subframe #6 may be deduced to be (x+2). In this case, the terminal may deduce the HARQ processor numbers using i described in Table 5. When the maximum value of the HARQ process number is y, the terminal may determine the HARQ process number of the uplink subframe #4 using 'x mod y', determine the HARQ process number of the uplink subframe #5 using '(x+1) mod y', and determine the HARQ process number of the uplink subframe #6 using '(x+2) mod y'. Here, y may be preset in the base station and the terminal. For example, the base station may inform y to the terminal through a higher layer signaling (e.g., RRC signaling), and y may be 16.

Alternatively, an actual value of the HARQ process number of the starting uplink subframe (e.g., the uplink subframe #4) among the plurality of uplink subframes scheduled by the multi-uplink grant may be transmitted through the multi-uplink grant A, and an offset (hereinafter referred to as '$H_{off}$') to the HARQ process number of the starting uplink subframe (e.g., the uplink subframe #4) may be transmitted through the corresponding multi-uplink grant (e.g., the multi-uplink grants B and C). In this case, the terminal may use $H_{off}$ and the HARQ process number of the staring uplink subframe (e.g., the uplink subframe #4) among the plurality of uplink subframes scheduled by the multi-uplink grant to deduce HARQ process numbers of the remaining subframes (e.g., the uplink subframes #5 and #6). Here, $H_{off}$ may be set to 0, 1, 2, . . . , $N_{SF}-1$.

When the HARQ process number of the uplink subframe #4 is x and the $H_{off}$ included in the multi-uplink grant B is 1, the HARQ processor number of the uplink subframe #5 may be deduced to be (x+1). When the HARQ subframe number of the uplink subframe #4 is x and the $H_{off}$ included in the multi-uplink grant C is 2, the HARQ processor number of the uplink subframe #6 may be deduced to be (x+2). On the other hand, when the maximum value of the HARQ process number is y, the terminal may determine the HARQ process number of the uplink subframe #4 using 'x mod y', determine the HARQ process number of the uplink subframe #5 using '(x+$H_{off}$ (i.e., 1)) mod y', and determine the HARQ process number of the uplink subframe #6 using '(x-$H_{off}$ (i.e., 2)) mod y'.

When the multi-uplink grant type 2 is used, the HARQ process number may be included in the individual fields of the multi-uplink grant. In FIG. 15, the HARQ process number of the uplink subframe #4 may be included in the individual field A of the multi-uplink grant, the HARQ process number of the uplink subframe #5 may be included in the individual field B of the multi-uplink grant, and the HARQ process number of the uplink subframe #6 may be included in the individual field C of the multi-uplink grant. Therefore, the terminal may identify the HARQ process numbers of the uplink subframes #4 to #6 based on the individual fields A, B, and C, respectively.

Alternatively, only the HARQ process number of the starting uplink subframe (e.g., the uplink subframe #4) among the plurality of uplink subframes scheduled by the multi-uplink grant may be transmitted through the individual field A of the multi-uplink grant, and the HARQ process numbers of the remaining uplink subframes (e.g., the uplink subframes #5 and #6) may not be transmitted through the corresponding individual fields (e.g., the individual fields B and C). In this case, the terminal may identify the HARQ process number of the uplink subframe #4 based on the multi-uplink grant A, and deduce the HARQ process numbers of the remaining uplink subframes (e.g., the uplink subframes #5 and #6) using the HARQ process number of the starting uplink subframe (e.g., the uplink subframe #4).

The HARQ process number may increase according to the increase of the uplink subframe number, and when the HARQ process number of the uplink subframe #4 obtained through the individual field A (or, the common field) of the multi-uplink grant is x, the HARQ process number of the uplink subframe #5 may be deduced to be (x+1), and the HARQ process number of the uplink subframe #6 may be deduced to be (x+2). Meanwhile, when the maximum value of the HARQ process number is y, the terminal may determine the HARQ process number of the uplink subframe #4 using 'x mod y', determine the HARQ process number of the uplink subframe #5 using '(x+1) mod y', and determine the HARQ process number of the uplink subframe #6 using '(x+2) mod y'.

Alternatively, an actual value of the HARQ process number of the starting uplink subframe (e.g., the uplink subframe #4) among the plurality of uplink subframes scheduled by the multi-uplink grant may be transmitted through the individual field A (or, the common field) of the multi-uplink grant, and an offset (hereinafter referred to as '$H_{off}$') to the HARQ process number of the starting uplink subframe (e.g., the uplink subframe #4) may be transmitted through the corresponding individual fields (e.g., the individual fields A, B, and C) of the multi-uplink grant.

In this case, the terminal may use $H_{off}$ and the HARQ process number of the staring uplink subframe (e.g., the uplink subframe #4) among the plurality of uplink subframes scheduled by the multi-uplink grant to deduce HARQ process numbers of the remaining subframes (e.g., the uplink subframes #5 and #6). Here, $H_{off}$ may be set to 0, 1, 2, . . . , $N_{SF}-1$.

When the HARQ process number of the uplink subframe #4 is x and the $H_{off}$ included in the individual field B is 1, the HARQ processor number of the uplink subframe #5 may be deduced to be (x+1). When the HARQ subframe number of the uplink subframe #4 is x and the $H_{off}$ included in the individual field C is 2, the HARQ processor number of the uplink subframe #6 may be deduced to be (x+2). On the other hand, when the maximum value of the HARQ process number is y, the terminal may determine the HARQ process number of the uplink subframe #4 using 'x mod y', determine the HARQ process number of the uplink subframe #5 using '(x+$H_{off}$ (i.e., 1)) mod y', and determine the HARQ process number of the uplink subframe #6 using '(x+$H_{off}$ (i.e., 2)) mod y'.

Based on the above-described scheme, the base station may inform the terminal of the HARQ process number, and the terminal may identify the HARQ process number based on the information included in the multi-uplink grant.

RV

When the multi-uplink grant type 1 is used, the RV may be included in the multi-uplink grant. In FIG. 15, the RV may be included in each of the multi-uplink grants A, B, and C. Therefore, the terminal may identify the RVs of the uplink subframes #4 to #6 based on the multi-uplink grants A, B, and C, respectively.

When the multi-uplink grant type 2 is used, the RV may be included in the common field or the individual fields of the multi-uplink grant. In FIG. 15, when the same RV is used in the uplink subframes #4 to #6, the corresponding RV may be included in the common field of the multi-uplink grant. Therefore, the terminal may identify the RVs for the uplink subframes #4 to #6 based on the common field. Alternatively, when different RVs are used in the respective uplink subframes #4 to #6, the RV for the uplink subframe #4 may be included in the individual field A, the RV for the uplink subframe #5 may be included in the individual field B, and the RV for the uplink subframe #6 may be included in the individual field C. Therefore, the terminal may identify the RVs of the uplink subframes #4 to #6 on the basis of the individual fields A, B and C, respectively.

Alternatively, the RV may be deduced based on the NDI. In this case, the RV may not be included in the multi-uplink grant. For example, a change order of the RV may be predefined, the RV may be set according to the predefined change order when the NDI is '0', and the RV may be initialized to an initial value (e.g., '0') when the NDI is '1'. In case that the predefined change order is '0→2→1', once the multi-uplink grant (or individual field) including the NDI set to '0' is received, the RV of the uplink subframe may be set to 2, and if the multi-uplink grant (or individual field) including the NDI set to '0' is received twice, the RV of the uplink subframe may be set to '1'.

In case that the multi-uplink grant type 1 is used, when the multi-uplink grant A includes the NDI set to '1', the terminal may set the RV of the uplink subframe #4 to the initial value (e.g., '0'). When the multi-uplink grant B includes the NDI set to '0', the terminal may set the RV of the uplink subframe

5 to '2'. When the multi-uplink grant C includes the NDI set to '0', the terminal may set the RV of the uplink subframe #6 to '2'.

In case that the multi-uplink grant type 2 is used, when the individual field A includes the NDI set to '1', the terminal may set the RV of the uplink subframe #4 to the initial value (e.g., '0'). When the individual field B includes the NDI set to '0', the terminal may set the RV of the uplink subframe #5 to '2'. When the individual field C includes the NDI set to '0', the terminal may set the RV of the uplink subframe #6 to '2'.

Based on the above-described schemes, the base station may inform the terminal of the RV, and the terminal may identify the RV based on the information included in the multi-uplink grant.

$N_{SF}$

The $N_{SF}$ may indicate the number of uplink subframes scheduled by the multi-uplink grant. The $N_{SF}$ may be set below the $M_{SF}$.

When the multi-uplink grant type 1 is used, the $N_{SF}$ may be included in the multi-uplink grant. In FIG. 15, the $N_{SF}$ may be included in each of the multi-uplink grants A, B, and C. Alternatively, since the same $N_{SF}$ is configured for the uplink subframes #4 to #6, the $N_{SF}$ may be included only in the multi-uplink grant A. Alternatively, the $N_{SF}$ may not be included in each of the multi-uplink grants A, B, and C. In this case, the $N_{SF}$ may be preset in the base station and the terminal. When the multi-uplink grant type 2 is used, the $N_{SF}$ may be included in the common field of the multi-uplink grant. In FIG. 15, the $N_{SF}$ may be included in the common field of the multi-uplink grant that schedules the uplink subframes #4 to #6.

The number of uplink subframes scheduled by the multi-uplink grant may be deduced based on the HARQ process number and the NDI instead of the $N_{SF}$. In this case, the $N_{SF}$ may not be included in the multi-uplink grant.

For example, the number of uplink subframes scheduled by the multi-uplink grant may be deduced based on a valid HARQ process number. In FIG. 15, when the HARQ process number of the uplink subframe #4 is x, the HARQ process number of the uplink subframe #5 is (x+1), the HARQ process number of the uplink subframe #6 is (x+2), and the HARQ process number of the uplink subframe #7 is x, the HARQ process number of the uplink subframe #4 may be the same as the HARQ process number of the uplink subframe #7. That is, when $M_{SF}$ is 4 and $N_{SF}$ is 3, the multi-uplink grant may include a field indicating the HARQ process number of the uplink subframe #7. In this case, the base station may configure the HARQ process number of the uplink subframe #7 to be the same as the HARQ process number (e.g., x, (x+1), or (x+2)) of one uplink subframe among the previous uplink subframes #4 to #6.

When there are a plurality of uplink subframes having the same HARQ process number, the terminal may determine a first uplink subframe in time domain among the plurality of uplink subframes having the same HARQ process number as an effective uplink subframe. Accordingly, the terminal may determine the uplink subframe #4 before the uplink subframe #7 as the effective uplink subframe. The terminal may determine that the uplink subframes #4 to #6 are scheduled by the multi-uplink grant and that the uplink subframe #7 is not scheduled by the multi-uplink grant. In this case, since the effective uplink subframes determined based on the HARQ process number are the uplink subframes #4 to #6, the terminal may determine that the multi-uplink grant schedules 3 uplink subframes.

Alternatively, the number of uplink subframes scheduled by the multi-uplink grant may be deduced based on the HARQ process number and the NDI. That is, the NDI may be further considered to deduce the number of uplink subframes scheduled by the multi-uplink grant.

In the example described above, the NDI of at least one uplink subframe excluding the first uplink subframe among the plurality of uplink subframes having the same HARQ process number may be identified. The terminal may determine that the uplink subframe including the NDI set to '0' is scheduled by the multi-uplink grant, and determine that the uplink subframe including the NDI set to '1' it is not scheduled by the multi-uplink grant. For example, when the NDI for the uplink subframe #7 is set to '0', the terminal may determine that the uplink subframe #7 is scheduled by the multi-uplink grant. Therefore, the terminal may determine that the multi-uplink grant schedules 4 uplink subframes. Alternatively, if the NDI for the uplink subframe #7 is set to '1', the terminal may determine that the uplink subframe #7 is not scheduled by the multi-uplink grant. Therefore, the terminal may determine that the multi-uplink grant schedules 3 uplink subframes.

Based on the schemes described above, the base station may inform the terminal of the number of uplink subframes scheduled by the multi-uplink grant, and the terminal may identify the number of uplink subframes scheduled by the multi-uplink grant on the basis of the information included in the multi-uplink grant.

l, k, i l may denote an interval between a transmission time of the multi-uplink grant and a transmission time of the first uplink subframe (e.g., the starting uplink subframe) among the plurality of uplink subframes scheduled by the multi-uplink grant. l may be an integer equal to or greater than zero. For example, l may be set to 4.

l may be transmitted to the terminal via a higher layer signaling (e.g., RRC signaling) in step S1600. Alternatively, when the multi-uplink grant type 1 is used, l may be included in the multi-uplink grant. In FIG. 15, l may be included in each of the multi-uplink grants A, B and C, respectively. Alternatively, since the same l is configured for the uplink subframes #4 to #6, l may be included in the multi-uplink grant A for the starting uplink subframe (e.g., the uplink subframe #4) among the plurality of uplink subframes scheduled by the multi-uplink grant. When the multi-uplink grant type 2 is used, l may be included in the common field of the multi-uplink grant. In FIG. 15, l may be included in the common field of the multi-uplink grant for the uplink subframes #4 to #6.

Meanwhile, transmission of the uplink subframes #(n+l) to #(n+l+($N_{SF}$−1)) may be scheduled generally by the multi-uplink grant transmitted through the subframe #n. However, due to a network environment (e.g., a subframe structure, etc.), transmission of the uplink subframe #(n+l) may not be scheduled by the multi-uplink grant transmitted through the subframe #n. For example, the scheduling of the starting uplink subframe by the multi-uplink grant may be delayed by k.

In this case, k may indicate the scheduling delay offset. When the multi-uplink grant is transmitted through the subframe #n, k may indicate an offset between the subframe #(n+l) and the actual starting uplink subframe (e.g., the subframe #(n+l+k)). That is, k may be the scheduling delay offset from the subframe #(n+l). k may be an integer greater than or equal to zero. The maximum value of k may be limited. For example, the maximum value of k may be 8 or 16.

When the multi-uplink grant type 1 is used, k may be included in the multi-uplink grant. In FIG. 15, k may be included in each of the multi-uplink grants A, B and C, respectively. Alternatively, since the same k is set for the uplink subframes #4 to #6, k may be included in the multi-uplink grant A for the starting uplink subframe (e.g., the uplink subframe #4) among the plurality of uplink subframes scheduled by the multi-uplink grant. When the multi-uplink grant type 2 is used, k may be included in the common field of the multi-uplink grant. In FIG. 15, k may be included in the common field of the multi-uplink grant for the uplink subframes #4 to #6.

Meanwhile, a time at which the multi-uplink grant is applied may be dynamically set based on the above-described k.

Figure 17:
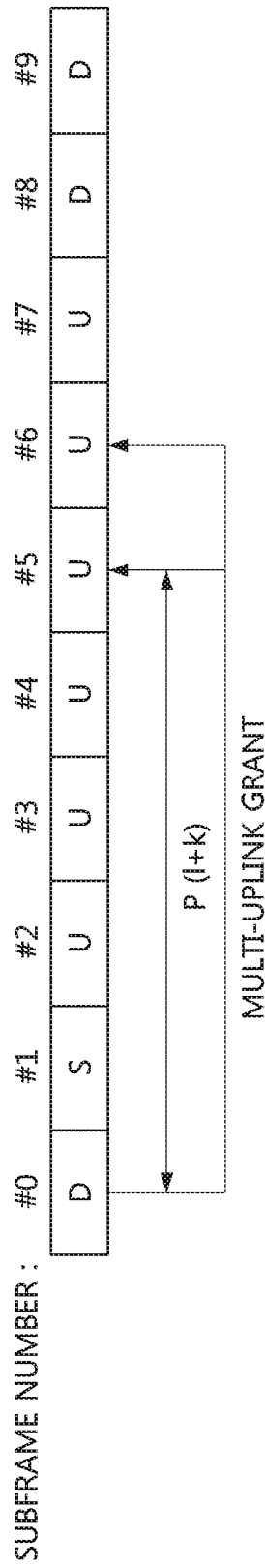
FIG. 17 is a conceptual diagram illustrating a third embodiment of a scheduled subframe in a communication network.

FIG. 17 is a conceptual diagram illustrating a third embodiment of a scheduled subframe in a communication network.

Referring to FIG. 17, in an unlicensed band, a radio frame may include 10 subframes. For example, a radio frame may comprise six uplink subframes, three downlink subframes, and one special subframe. The base station may transmit a multi-uplink grant through the subframe #0 to schedule uplink transmissions of the subframes #5 and #6. P (i.e., l+k) may indicate an interval between a starting uplink subframe among a plurality of uplink subframes scheduled by a multi-uplink grant and a subframe through which the multi-uplink grant is transmitted. P may be variably set. If l is a fixed value, P may be indicated by l and k. For example, when l=4, P may be indicated by l=4 and k=1. Alternatively, if l is a variable value, P may be indicated by l. That is, l may be set to 5.

Meanwhile, i may indicate the index of each of the uplink subframes scheduled by the multi-uplink grant. i may be set to 0, 1, . . . , $N_{SF}$−1. For example, among the uplink subframes scheduled by the multi-uplink grant, i for the first uplink subframe (e.g., the starting uplink subframe) may be set to '0', i for the second uplink subframe may be set to '1', and i for the last uplink subframe may be set to '$N_{SF}$−1'.

When the multi-uplink grant type 1 is used, i may be included in the multi-uplink grant. In FIG. 15, i may be included in each of the multi-uplink grants A, B, and C. For example, the multi-uplink grant A may include i set to '0', the multi-uplink grant B may include i set to '0', and the multi-uplink grant C may include i set to '0'. Alternatively, i may not be included in each of the multi-uplink grants A, B and C. In this case, the terminal may deduce i according to a subframe order.

When the multi-uplink grant type 2 is used, i may be included in an individual field of the multi-uplink grant. In FIG. 15, i may be included in each of the individual fields A, B and C of the multi-uplink grant. For example, the individual field A may include i set to '0', the individual field B may include i set to '1', and the individual field C may include i set to '2'.

Meanwhile, the base station may indicate a subframe number scheduled by the multi-uplink grant (or, the common field, the individual field) using l, k and i, and the terminal may identify the subframe number scheduled by the multi-uplink grant (or, the common field, the individual field) using l, k, and i. In FIG. 15, when the multi-uplink grant type 1 is used, the multi-uplink grant A may include k set to '0' and i set to '0' (or, l set to '4', k set to '0', and i set to '0'), the multi-uplink grant B may include k set to '1' and i set to '0' (or, l set to '4', k set to '1', and i set to '0'), and the multi-uplink grant C may include k set to '2' and i set to '0' (or, l set to '4', k set to '2', and i set to '0'). In this case, based on l, k and i, the terminal may identify that the uplink subframe #4 is scheduled by the multi-uplink grant A, the uplink subframe #5 is scheduled by the multi-uplink grant B, and the uplink subframe #6 is scheduled by the multi-uplink grant C.

In FIG. 15, when the multi-uplink grant type 2 is used, the common field may include k set to '0' (or, l set to '4' and k set to '0'), the individual field A may include i set to '0', the individual field B may include l set to '1', and the individual field C may include l set to '2'. In this case, based on l, k and i, the terminal may identify that the uplink subframe #4 is scheduled by the common field and the individual field A, the uplink subframe #5 is scheduled by the common field and the individual field B, and the uplink subframe #6 is scheduled by the common filed and the individual field C. Alternatively, each of the individual fields A, B and C may not include i. In this case, the terminal may deduce i according to a subframe order and identify the uplink subframe scheduled by each of the individual fields based on the l, k and deduced i.

That is, when the multi-uplink grant is transmitted through the subframe #n, the subframe #(n+l+k+i) may be scheduled by the multi-uplink grant. If the radio frame includes 10 subframes, the terminal may identify the subframe scheduled by the multi-uplink grant based on 'n+l+k+i mod 10'.

Based on the scheme described above, the base station may inform l, k and i to the terminal, and the terminal may determine a subframe number to be scheduled by the multi-uplink grant based on l, k and i included in the multi-uplink grant.

Length Information

The length of the uplink subframe scheduled by the multi-uplink grant may be variably set. For example, the length of the uplink subframe may be variably set for performing a channel access procedure.

When a plurality of uplink subframes are scheduled by a multi-uplink grant, the length information includes a starting position of a starting uplink subframe and an ending position of an ending uplink subframe among the plurality of uplink subframes, and may include a starting position and an ending position of each of the plurality of uplink subframes.

The length information indicating at least one of the starting position of the starting uplink subframe and the ending position of the ending uplink subframe among the plurality of uplink subframes scheduled by the multi-uplink grant may be referred to as 'length type 1'. The length information indicating at least one of the starting position and the ending position of each of the plurality of uplink subframes scheduled by the multiple uplink grant may be referred to as 'length type 2'.

The starting position of the uplink subframe indicated by the 'length type 1' may be as follows.

Figure 18:
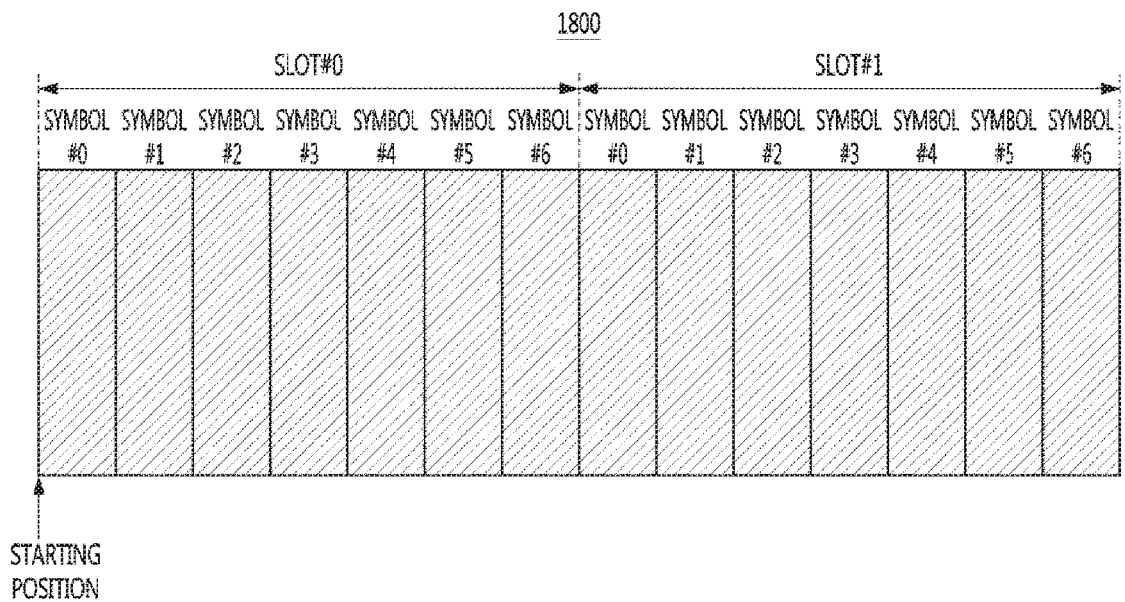
FIG. 18 is a conceptual diagram illustrating a first embodiment of a starting position of an uplink subframe.
Figure 19:
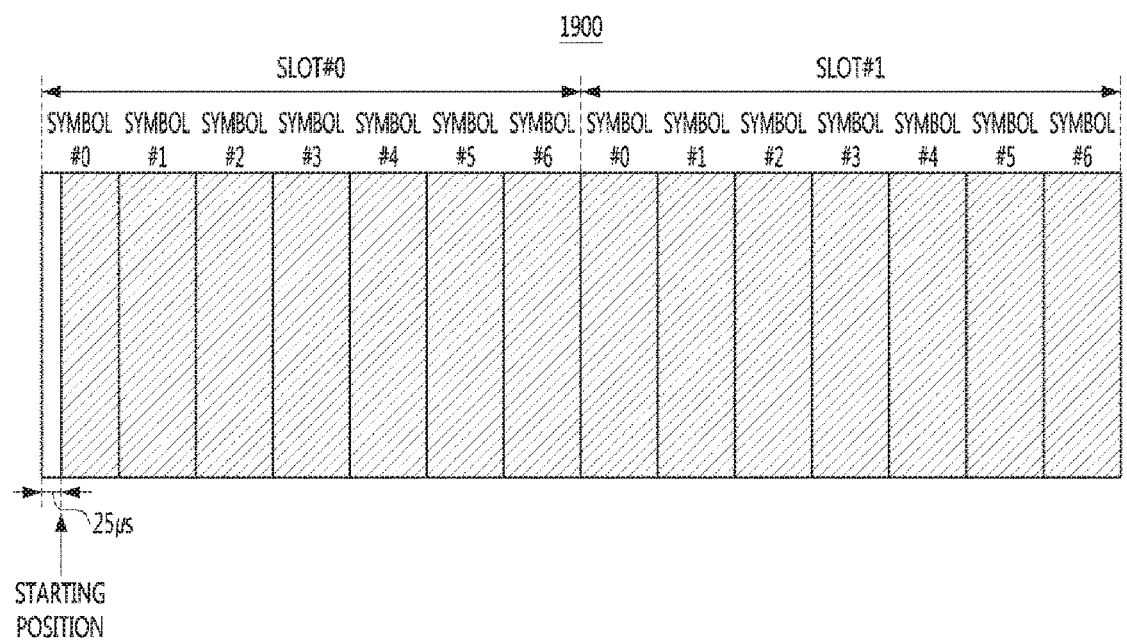
FIG. 19 is a conceptual diagram illustrating a second embodiment of a starting position of an uplink subframe.
Figure 20:
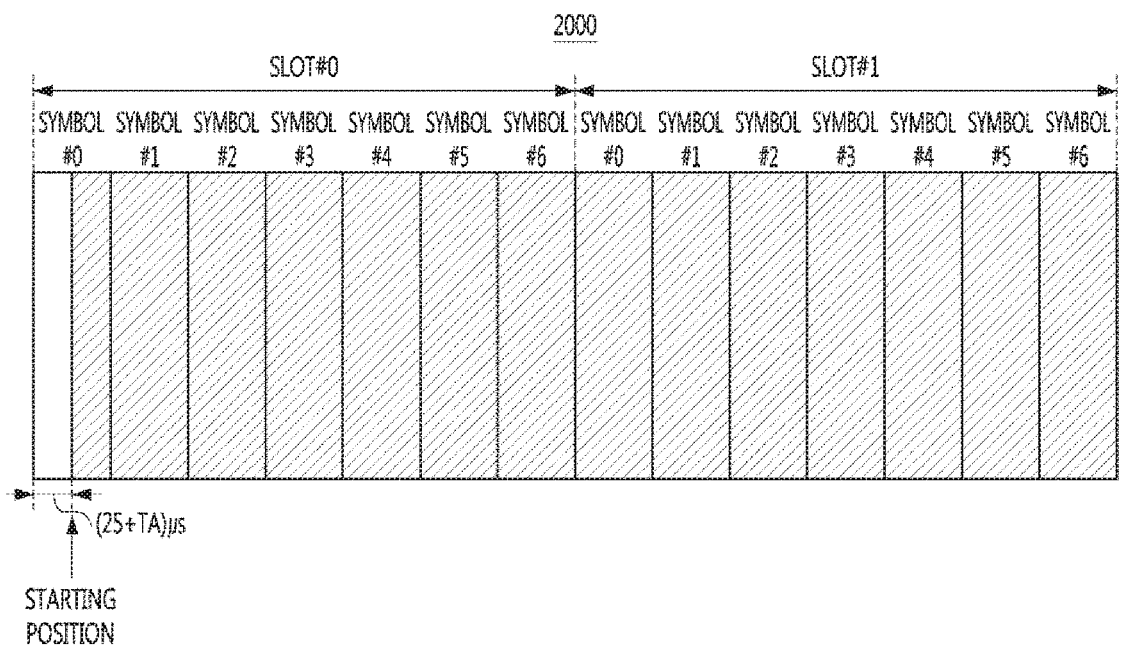
FIG. 20 is a conceptual diagram illustrating a third embodiment of a starting position of an uplink subframe.
Figure 21:
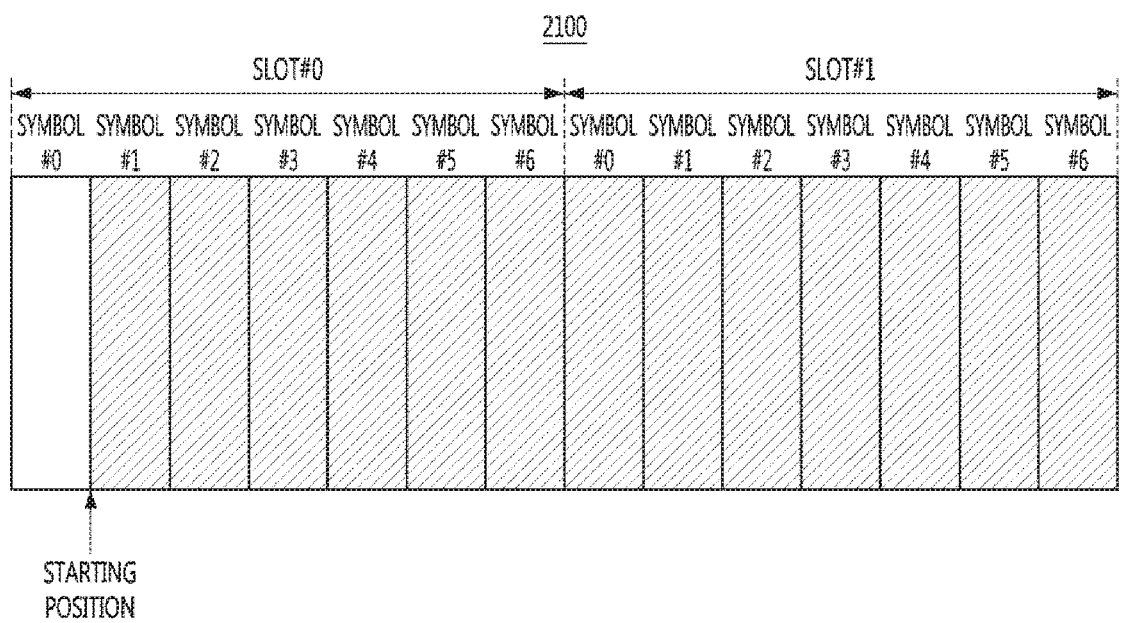
FIG. 21 is a conceptual diagram illustrating a fourth embodiment of a starting position of an uplink subframe.

FIG. 18 is a conceptual diagram illustrating a first embodiment of a starting position of an uplink subframe, FIG. 19 is a conceptual diagram illustrating a second embodiment of a starting position of an uplink subframe, FIG. 20 is a conceptual diagram illustrating a third embodiment of a starting position of an uplink subframe, and FIG. 21 is a conceptual diagram illustrating a fourth embodiment of a starting position of an uplink subframe.

Referring to FIGS. 18 to 21, a starting uplink subframe may be the same as or similar to the uplink subframe shown in FIG. 10. In the uplink subframe 1800 of FIG. 18, the starting position of the uplink subframe indicated by the length type 1 may be the symbol #0 of the slot #0. In this case, the terminal may configure the uplink subframe 1800 including the symbol #0 of the slot #0 to the symbol #6 of the slot #1. In the uplink subframe 1900 of FIG. 19, the starting position of the uplink subframe indicated by the length type 1 may be a specific time (e.g., 25 μs) in the symbol #0 of the slot #0. In this case, the terminal may configure the uplink subframe 1900 including the specific time (e.g., 25 μs) in the symbol #0 of the slot #0 to the symbol #6 of the slot #1. In the uplink subframe 2000 of FIG. 20, the starting position of the uplink subframe indicated by the length type 1 may be a specific time (e.g., (25+TA) μs) in the symbol #0 of the slot #0. In this case, the terminal may configure the uplink subframe 2000 including the specific time (e.g., (25+TA) μs) in the symbol #0 of the slot #0 to the symbol #6 of the slot #1. Here, TA may indicate a timing advance or other value. In the uplink subframe 2100 of FIG. 21, the starting position of the uplink subframe indicated by the length type 1 may be the symbol #1 of the slot #0. In this case, the terminal may configure the uplink subframe 2100 including the symbol #1 of the slot #0 to the symbol #6 of the slot #1.

The length type 1 indicating the starting position of the starting uplink subframe may be configured based on Table 6 below.

TABLE 6

| Value | Starting position |
|---|---|
| 00 | Symbol #0 |
| 01 | 25 μs in symbol #0 |
| 10 | (25 + TA) μs in symbol #0 |
| 11 | Symbol #1 |

The ending position of the ending uplink subframe indicated by the 'length type 1' may be as follows.

Figure 22:
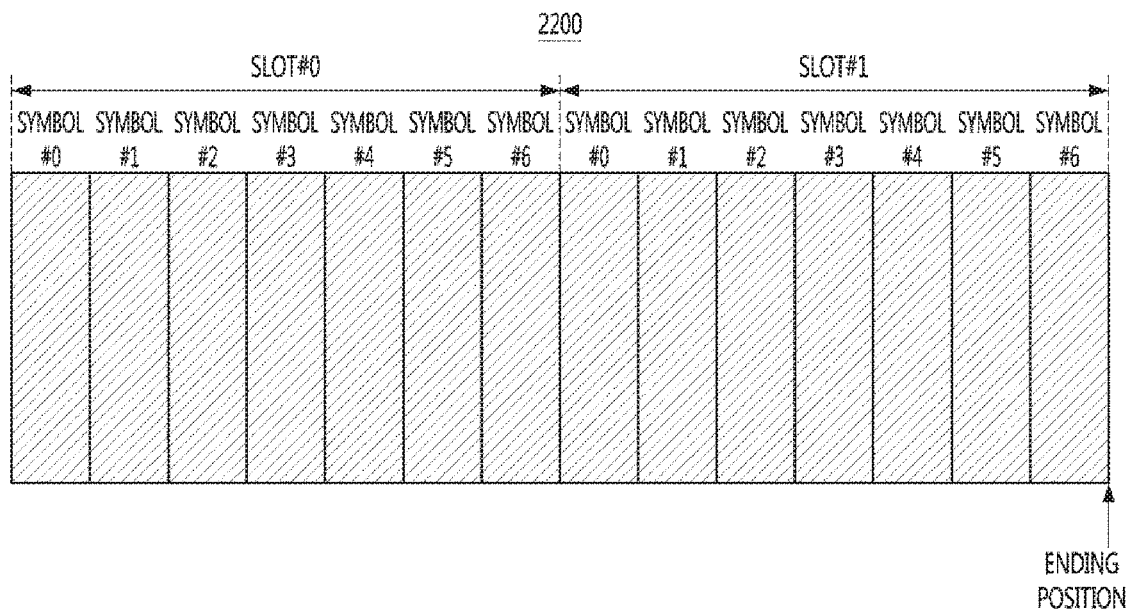
FIG. 22 is a conceptual diagram illustrating a first embodiment of an ending position of an uplink subframe.
Figure 23:
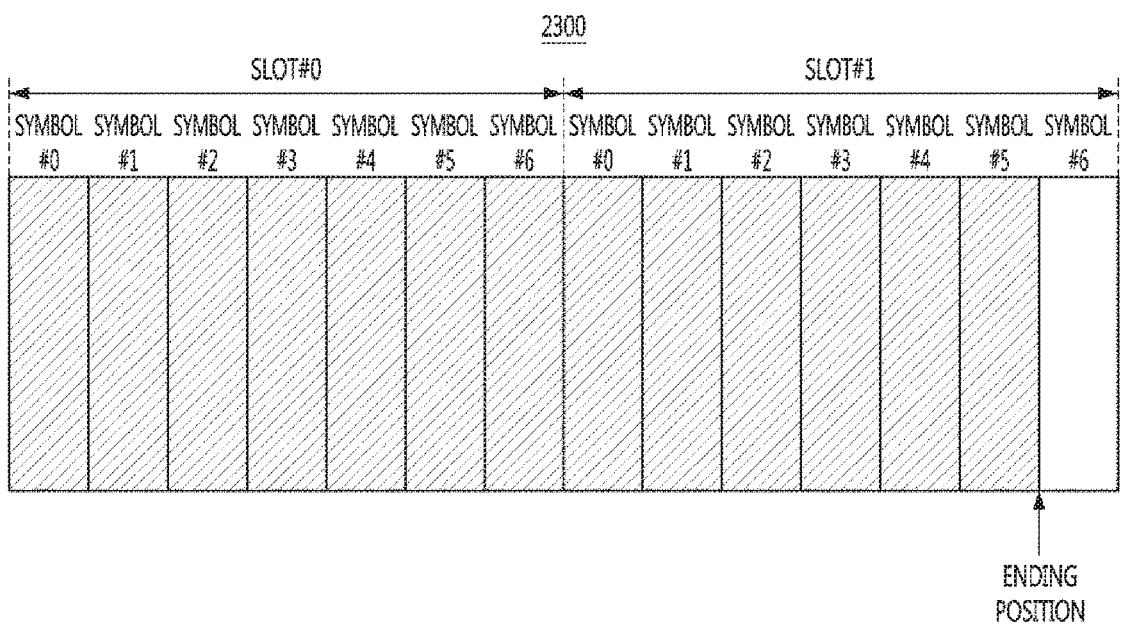
FIG. 23 is a conceptual diagram illustrating a second embodiment of an ending position of an uplink subframe.

FIG. 22 is a conceptual diagram illustrating a first embodiment of an ending position of an uplink subframe, and FIG. 23 is a conceptual diagram illustrating a second embodiment of an ending position of an uplink subframe.

Referring to FIG. 22 and FIG. 23, the ending uplink subframe may be the same as or similar to the uplink subframe shown in FIG. 10. In the uplink subframe 2200 of FIG. 22, the ending position of the uplink subframe indicated by the length type 1 may be the symbol #6 of the slot #1. In this case, the terminal may configure the uplink subframe 2200 including the symbol #0 of the slot #0 to the symbol #6 of the slot #1. In the uplink subframe 2300 of FIG. 23, the ending position of the uplink subframe indicated by the length type 1 may be the symbol #5 of the slot #1. In this case, the terminal may configure the uplink subframe 2300 including the symbol #0 of the slot #0 to the symbol #5 of the slot #1.

The 'length type 1' indicating the ending position of the uplink subframe may be expressed as shown in Table 7 below.

TABLE 7

| Value | Ending position |
|---|---|
| 0 | Symbol #6 |
| 1 | Symbol #5 |

The length type 1 may include at least one of a starting position field and an ending position field. The starting position field of the length type 1 may be set based on Table 6, and the ending position field of the length type 1 may be set based on Table 7.

Meanwhile, the starting position of the uplink subframe indicated by the length type 2 may be the same as or similar to the starting position of the uplink subframe shown in FIGS. 18 to 21. The length type 2 indicating the starting position of the uplink subframe may be set based on Table 6. The ending position of the uplink subframe indicated by the length type 2 may be the same or similar to the ending position shown in FIGS. 22 and 23. The length type 2 indicating the ending position of the uplink subframe may be set based on Table 7. The length type 2 may include at least one of a starting position field and an ending position field. The starting position field of the length type 2 may be set based on Table 6, and the ending position field of the length type 2 may be set based on Table 7.

When the multi-uplink grant type 1 and the length type 1 are used, the multi-uplink grant may include the length type 1 for the plurality of uplink subframes scheduled by the multi-uplink grant. In FIG. 15, the length type 1 may be included in each of the multi-uplink grants A, B and C. In this case, the terminal may configure the uplink subframe #4 based on the starting position indicated by the length type 1 included in the multi-uplink grant A, the uplink subframe #5 including 14 SC-FDMA symbols, and the uplink subframe #6 based on the ending position indicated by the length type 1 included in the multi-uplink grant C. Alternatively, the length type 1 may be included only in the multi-uplink grant A. In this case, the terminal may configure the uplink subframe #6 based on the ending position indicated by the length type 1 included in the multi-uplink grant A. Here, when the starting position field of the length type 1 indicates the symbol #0 of the slot #0, the corresponding starting position field may be omitted. When the ending position field of the length type 1 indicates the symbol #6 of the slot #1, the ending position field may be omitted.

When the multi-uplink grant type 1 and the length type 2 are used, the multi-uplink grant may include the length type 2 for the plurality of uplink subframes scheduled by the multi-uplink grant. The length type 2 may be configured for each of the plurality of uplink subframes scheduled by the multi-uplink grant. In FIG. 15, the length type 2 for the uplink subframe #4 may be included in the multi-uplink grant A, the length type 2 for the uplink subframe #5 may be included in the multi-uplink grant B, and the length type 2 for the uplink subframe #6 may be included in the multi-uplink grant C. In this case, the terminal may configure the uplink subframe #4 based on at least one of the starting position and the ending position indicated by the length type 2 included in the multi-uplink grant A, the uplink subframe #5 based on at least one of the starting position and the ending position indicated by the length type 2 included in the multi-uplink grant B, and the uplink subframe #6 based on at least one of the starting position and the ending position indicated by the length type 2 included in the multi-uplink grant C. Here, when the starting position field of the length type 2 indicates the symbol #0 of the slot #0, the corresponding starting position field may be omitted. When the ending position field of the length type 2 indicates the symbol #6 of the slot #1, the ending position field may be omitted.

When the multi-uplink grant type 2 and the length type 1 are used, the common field of the multi-uplink grant may include the length type 1 for the plurality of uplink subframes scheduled by the multi-uplink grant. In FIG. 15, the length type 1 may be included in the common field of the multi-uplink grant scheduling the uplink subframes #4 to #6. In this case, the terminal may configure the uplink subframe #4 based on the starting position indicated by the length type 1 included in the common filed of the multi-uplink grant, the uplink subframe #5 including 14 SC-FDMA symbols, and the uplink subframe #6 based on the ending position indicated by the length type 1 included in the common filed of the multi-uplink grant. Here, when the starting position field of the length type 1 indicates the symbol #0 of the slot #0, the corresponding starting position field may be omitted. When the ending position field of the length type 1 indicates the symbol #6 of the slot #1, the ending position field may be omitted.

When the multi-uplink grant type 2 and the length type 2 are used, at least one of the common field and the individual field of the multi-uplink grant may include the length type 2. In FIG. 15, in case that the same length type 2 is used for the uplink subframes #4 to #6 (e.g., when the starting positions and ending positions are the same in the uplink subframes #4 to #6), the common field of the multi-uplink grant may include the length type 2. Alternatively, when the starting position fields of the length type 2 are set identically and the ending position fields of the length type 2 are set differently in the uplink subframe #4 to #6, the common field of the multi-uplink grant may include the starting position filed for the uplink subframes #4 to #6, the individual field A of the multi-uplink grant may include the ending position field for the uplink subframe #4, the individual field B of the multi-uplink grant may include the end position field for the uplink subframe #5, and the individual field C of the multi-uplink grant may include the ending position field for the uplink subframe #6.

Alternatively, when the starting position fields of the length type 2 are set differently and the ending position field of the length type 2 is set the same in the uplink subframe #4 to #6, the common field of the multi-uplink grant may include the ending position field for the uplink subframes #4 to #6, the individual field A of the multi-uplink grant may include the starting position field for the uplink subframe #4, the individual field B of the multi-uplink grant may include the starting position field for the uplink subframe #5, and the individual field C of the multi-uplink grant may include the starting position field for the uplink subframe #6. Here, when the starting position field of the length type 2 indicates the symbol #0 of the slot #0, the corresponding starting position field may be omitted. When the ending position field of the length type 2 indicates the symbol #6 of the slot #1, the ending position field may be omitted.

When the multi-uplink grant type 2, the length type 1, and the length type 2 are used, the common field of the multi-uplink grant may include the length type 1 and the individual field of the multi-uplink grant may include the length type 2. In FIG. 15, the common field for the uplink subframes #4 to #6 may include the starting position field of the length type 1, the individual field A of the multi-uplink grant may include the ending position field of the length type 2 for the uplink subframe #4, the individual field B of the multi-uplink grant may include the ending position field of the length type 2 for the uplink subframe #5, and the individual field C of the multi-uplink grant may include the ending position field of the length type 2 for the uplink subframe #6. In this case, the terminal may configure the uplink subframe #4 including a region formed by the starting position indicated by the length type 1 and the ending position indicated by the length type 2 of the individual field A, the uplink subframe #5 including a region formed by the symbol #0 and the slot #0 and the ending position indicated by the length type 2 of the individual field B, and the uplink subframe #6 including a region formed by the symbol #0 of the slot #0 and the ending position indicated by the length type 2 of the individual field C.

Alternatively, the common field for the uplink subframes #4 to #6 may include the ending position field of the length type 1, the individual field A may include the starting position field of the length type 2 for the uplink subframe #4, the individual field B may include the starting position field of the length type 2 for the uplink subframe #5, and the individual field C may include the starting position field of the length type 2 for the uplink subframe #6. In this case, the terminal may configure the uplink subframe #4 including a region formed by the starting position indicated by the length type 2 of the individual field A and the symbol #6 of the slot #1, the uplink subframe #5 including a region formed by the starting position indicated by the length type 2 of the individual field B and the symbol #6 and the slot #1, and the uplink subframe #6 including a region formed by the starting position indicated by the length type 2 of the individual field C and the ending position indicated by the length type 1 of the common field.

Based on the above-described scheme, the base station may inform the terminal of the length information of the uplink subframe scheduled by the multi-uplink grant, and the terminal may identify the length information of the uplink subframe scheduled by the multi-uplink grant based on the information included in the multi-uplink grant.

Channel Access Related Information

When a multi-uplink grant is received, the terminal may identify a channel (or, slot) status by performing a channel access procedure before transmission of an uplink subframe scheduled by the multi-uplink grant. The channel access procedure may be an LBT procedure. If the channel status is determined to be an idle state, the terminal may transmit the uplink subframe scheduled by the multi-uplink grant. On the other hand, if the channel status is determined to be a busy state, the terminal may not transmit the uplink subframe scheduled by the multi-uplink grant.

The channel access related information may include at least one of an indicator (hereinafter, referred to as 'access indicator') indicating whether to perform a channel access procedure, a channel access procedure type (e.g., type 1 or type 2), and an execution time of the channel access procedure.

The access indicator may be classified into an 'access indicator type 1' and an 'access indicator type 2'. The access indicator type 1 may indicate whether to perform the channel access procedure in the starting uplink subframe. The access indicator type 2 may indicate whether to perform the channel access procedure in each of the uplink subframes.

In FIG. 15, when the multi-uplink grant type 1 and the access indicator type 1 are used, the access indicator type 1 may be included in each of the multi-uplink grants A, B, and C. Since the same access indicator type 1 is set in the uplink subframes #4 to #6, the access indicator type 1 may be included only in the multi-uplink grant A.

Alternatively, when the multi-uplink grant type 1 and the access indicator type 2 are used, the access indicator type 2 for the uplink subframe #4 may be included in multi-uplink grant A, the access indicator type 2 for the uplink subframe #5 may be included in the multi-uplink grant B, and the access indicator type 2 for the uplink subframe #6 may be included in the multi-uplink grant C. When the same access indicator type 2 is set in the uplink subframes #4 to #6, the access indicator type 2 may be included only in the multi-uplink grant A. In this case, the terminal may determine whether to perform the channel access procedure in the uplink subframes #4 to #6 based on the access indicator type 2 included in the multi-uplink grant A.

In FIG. 15, when the multi-uplink grant type 2 and the access indicator type 1 are used, the access indicator type 1 may be included in the common field of the multi-uplink grant scheduling the uplink subframes #4 to #6.

Alternatively, when the multi-uplink grant type 2 and the access indicator type 2 are used, the access indicator type 2 for the uplink subframe #4 may be included in the individual field A, the access indicator type 2 for the uplink subframe #5 may be included in the individual field B, and the access indicator type 2 for the uplink subframe #6 may be included in the individual field C. When the same access indicator type 2 is set in the uplink subframes #4 to #6, the access indicator type 2 may be included in the common field.

Meanwhile, when the base station and the terminal are configured in advance to perform a channel access procedure for transmission of an uplink subframe, the channel access related information may not include the access indicator. Alternatively, the access indicator may be deduced based on the length information of the uplink subframe. In this case, the channel access related information may not include the access indicator. For example, when the starting position according to each of the length type 1 and the length type 2 indicates '00' in Table 6, the terminal may determine that the channel access procedure is not performed. When the starting position according to each of the length type 1 and the length type 2 indicates one of '01', '10', and '11' in Table 6, the terminal may determine that the channel access procedure is to be performed. When the ending position according to each of the length type 1 and the length type 2 indicates '0' in Table 7, the terminal may determine that the channel access procedure is not performed. When the ending position according to each of the length type 1 and the length type 2 indicates '1' in Table 7, the terminal may determine that the channel access procedure is to be performed.

The channel access procedure type may be classified into a 'channel access procedure type 1' and a 'channel access procedure type 2'. When the channel access procedure type 1 is used, the terminal may randomly select a backoff counter within a contention window, and if a channel status is determined to be in an idle state during a period corresponding to the backoff counter, the terminal may transmit an uplink subframe. Alternatively, the terminal may transmit an uplink subframe if the channel status is determined to be in an idle state during 'a period corresponding to the backoff counter+defer duration'. The contention window size may be determined based on a channel access priority. For example, the base station may determine the contention window size based on Table 8. $CW_{min}$ may indicate the minimum value of the contention window in a given channel access priority order, and $CW_{max}$ may indicate the maximum value of the contention window in the given channel access priority.

TABLE 8

| Channel access priority | $CW_{min}$ | $CW_{max}$ |
|---|---|---|
| 1 | 3 | 7 |
| 2 | 7 | 15 |
| 3 | 15 | 1023 |
| 4 | 15 | 1023 |

When the channel access procedure type 2 is used, the terminal may identify a channel status during a specific period (e.g., 25 μs) and transmit an uplink subframe if the channel status is idle. Alternatively, the terminal may identify the channel status during a period corresponding to 'specific period (e.g., 25 μs)+additional period', and may transmit an uplink subframe if the channel status is idle.

In FIG. 15, when the multi-uplink grant type 1 is used, the channel access procedure type (e.g., type 1 or type 2) for the uplink subframe #4 may be included in the multi-uplink grant A, the channel access procedure type (e.g., type 1 or type 2) for uplink subframe #5 may be included in the multi-uplink grant B, and the channel access procedure type (e.g., type 1 or type 2) for the plink subframe #6 may be included in the multi-uplink grant C. When the channel access procedure type is set to the same in the uplink subframes #4 to #6, the channel access procedure type (e.g., type 1 or type 2) may be included only in the multi-uplink grant A. In this case, the terminal may perform the channel access procedure for transmission of the uplink subframes #4 to #6 based on the channel access procedure type (e.g., type 1 or type 2) included in the multi-uplink grant A.

In FIG. 15, when the multi-uplink grant type 2 is used and the channel access procedure type is set to the same in the uplink subframes #4 to #6, the channel access procedure type (e.g., type 1 or type 2) may be included in the common field of the multi-uplink grant that schedules the uplink subframes #4 to #6. Alternatively, when the multi uplink grant type 2 is used and the channel access procedure types are set differently in the respective uplink subframes #4 to #6, the channel access procedure type (e.g., type 1 or type 2) for the uplink subframe #4 may be included in the individual field A, the channel access procedure type (e.g., type 1 or type 2) for the uplink subframe #5 may be included in the individual field B, and the channel access procedure type (e.g., type 1 or type 2) for the uplink subframe #6 may be included in the individual field C.

Meanwhile, the channel access procedure type may be deduced based on the length information of the uplink subframe. In this case, the channel access related information may not include the channel access procedure type. For example, when the starting position according to each of the length type 1 and the length type 2 indicates '01' or '10' in Table 6, the terminal may determine that the channel access procedure type 2 is used. When the starting position according to each of the length type 1 and the length type 2 indicates '11' in Table 6, the terminal may determine that the channel access procedure type 1 is used. When the ending position according to each of the length type 1 and the length type 2 indicates '1' in Table 7, the terminal may determine that the channel access procedure type 1 is used.

The execution time of the channel access procedure may be set based on Table 9 below. In Table 9, the current uplink subframe may be an uplink subframe scheduled by a multi-uplink grant (or an individual field).

TABLE 9

| Value | Description |
|---|---|
| 00 | Symbol #0 of slot #0 in starting uplink subframe |
| 01 | Symbol #6 of slot #1 in previous subframe of starting uplink subframe |
| 10 | Symbol #0 of slot #0 in current uplink subframe |
| 11 | Symbol #6 of slot #1 in previous subframe of current uplink subframe |

In FIG. 15, when the multi-uplink grant type 1 is used, the execution time of the channel access procedure in the uplink subframe #4 may be included in the multi-uplink grant A, the execution time of the channel access procedure in the uplink subframe #5 may be included in the multi-uplink grant B, and the execution time of the channel access procedure in the uplink subframe #6 may be included in the multi-uplink grant C. Alternatively, when the execution time of the channel access procedure is the same in the uplink subframes #4 to #6, the execution time of the channel access procedure may be included only in the multi-uplink grant A. In this case, the terminal may perform the channel access procedure in the uplink subframes #4 to #6 based on the execution time of the channel access procedure included in the multi-uplink grant A.

In FIG. 15, when the multi-uplink grant type 2 is used and the execution time of the channel access procedure in the uplink subframes #4 to #6 are set to be the same, the execution time of the channel access procedure may be included only in the common field of the multi-uplink grant. Alternatively, when the multi-uplink grant type 2 is used and the execution time of the channel access procedure in the uplink subframes #4 to #6 are set differently, the execution time of the channel access procedure for the uplink subframe #4 may be included in the individual field A, the execution time of the channel access procedure for the uplink subframe #5 may be included in the individual field B, and the execution time of the channel access procedure for the uplink subframe #6 may be included in the individual field C.

Meanwhile, the execution time of the channel access procedure may be deduced based on the length information of the uplink subframe. In this case, the channel access related information may not include the execution time of the channel access procedure. For example, when the starting position according to the length type 1 indicates one of '01', '10' and '11' in Table 6, the terminal may determine that the execution time of the channel access procedure is the symbol #0 of the slot #0 in the starting uplink subframe. When the starting position according to the length type 2 indicates one of '01', '10' and '11' in Table 6, the terminal may determine that the execution time of the channel access procedure is the symbol #0 of the slot #0 in the current uplink subframe.

Based on the above-described scheme, the base station may inform the terminal about the channel access related information, and the terminal may identify the channel access related information included in the multi-uplink grant.

SRS Index

The SRS index may indicate at least one uplink subframe in which the SRS is transmitted among the plurality of uplink subframes scheduled by the multi-uplink grant. For example, the SRS index may be set based on the first uplink subframe (e.g., the starting uplink subframe) among the plurality of uplink subframes scheduled by the multi-uplink grant. For example, the SRS index for the uplink subframes #4 to #6 shown in FIG. 15 may be set based on Table 10.

TABLE 10

| SRS index | Subframe number |
|---|---|
| 00 | #4 |
| 01 | #5 |
| 10 | #6 |
| 11 | Reserved |

When the SRS index includes '00', '01', and '10', the terminal may transmit SRS through each of the uplink subframes #4 to #6. Alternatively, if the SRS index includes only '01', the terminal may transmit SRS through the uplink subframe #5 and may not transmit SRS through the uplink subframes #4 and #6.

Also, in the multi-uplink grant, the SRS request and the SRS index may be configured as a single field (hereinafter referred to as 'SRS field'). When the SRS transmission is requested in the uplink subframe, the SRS field may be included in the multi-uplink grant. If the SRS transmission is not requested in the uplink subframe, the SRS field may not be included in the multi-uplink grant.

When the multi-uplink grant type 1 is used, the SRS index (or SRS field) may be included in each of the multi-uplink grants A, B and C. For example, when SRS is transmitted in the uplink subframe #4, the SRS index set to '00' may be included in the multi-uplink grant A, and when SRS is not transmitted in the uplink subframe #4, the SRS index may not be included in multi-uplink grant A. When SRS is transmitted in the uplink subframe #5, the SRS index set to '01' may be included in the multi-uplink grant B, and when SRS is not transmitted in the uplink subframe #5, the SRS index may not be included in the multi-uplink grant B. When SRS is transmitted in the uplink subframe #6, the SRS index set to '10' may be included in the multi-uplink grant C, and when SRS is not transmitted in the uplink subframe #6, the SRS index may not be included in the multi-uplink grant C.

When the multi-uplink grant type 2 is used, the SRS index (or SRS field) may be included in the common field of the multi-uplink grant that schedules the uplink subframes #4 to #6. Alternatively, the SRS index (or SRS field) may be included in each of the individual fields of the multi-uplink grant. For example, when SRS is transmitted in the uplink subframe #4, the SRS index set to '00' may be included in the individual field A, and when SRS is not transmitted in the uplink subframe #4, the SRS index may not be included in the individual field A. When SRS is transmitted in the uplink subframe #5, the SRS index set to '01' may be included in the individual field B, and when SRS is not transmitted in the uplink subframe #5, the SRS index may not be included in the individual field B. When SRS is transmitted in the uplink subframe #6, the SRS index set to '10' may be included in the individual field C, and when SRS is not transmitted in the uplink subframe #6, the SRS index may not be included in the individual field C.

Based on the above-described scheme, the base station may inform the terminal of the SRS index, and the terminal may identify the SRS index included in the multi-uplink grant.

Meanwhile, the base station may generate a DCI including the multi-uplink grant. The multi-uplink grant may be scrambled based on the RNTI. The format of the DCI including the multi-uplink grant may be 0A, 0B, 4A, or 4B.

When the multi-uplink grant type 1 is used, a DCI for each of the plurality of multi-uplink grants may be generated. In FIG. 15, a DCI for the multi-uplink grant A may be generated, a DCI for the multi-uplink grant B may be generated, and a DCI for the multi-uplink grant C may be generated. Each of the DCIs (or the multi-uplink grants A, B, and C) may be generated based on the common RNTI.

When the multi-uplink grant type 2 is used, a single DCI for the common field and the individual fields included in the multi-uplink grant may be generated. In FIG. 16, a single DCI may be generated that includes the common field, the individual field A, the individual field B, and the individual field C.

The base station may transmit the DCI through PDCCH/EPDCCH (S1630). The terminal may receive the DCI by monitoring (or, detecting) PDCCH/EPDCCH, and obtain the multi-uplink grant from the received DCI (S1640). Here, the terminal may obtain the DCI (i.e., the multi-uplink grant) based on the RNTI. In FIG. 15, when the multi-uplink grant type 1 is used, the terminal may acquire the multi-uplink grants A, B and C for each of the uplink subframes #4 to #6 using the same RNTI. Alternatively, when the multi-uplink grant type 2 is used, the terminal may acquire the multi-uplink grant for the uplink subframes #4 to #6 (i.e., the common field, and the individual fields A, B, and C).

Meanwhile, the terminal may receive the multi-uplink grant when the receiving function of the multi-uplink grant is activated. In this case, the terminal may not perform a reception operation of a conventional uplink grant (e.g., single-uplink grant).

The terminal may perform uplink transmission based on the information included in the multi-uplink grant (S1650). In FIG. 15, the terminal may confirm that the transmission of the uplink subframes #4 to #6 is scheduled by the multi-uplink grant. The terminal may confirm whether or not a channel access procedure is performed based on the channel access related information or the length information included in the multi-uplink grant. When the channel access procedure is performed before the transmission of the uplink subframes #4 to #6, the terminal may identify the execution time and the channel access procedure type based on the channel access related information, the length information, and the like.

The terminal may perform the channel access procedure based on the identified channel access procedure type at the execution time of the channel access procedure. For example, the terminal may perform the channel access procedure in the symbol #0 of the slot #0 of the uplink subframe #4 (or the symbol #6 of the slot #1 of the uplink subframe #3), and when a channel status is determined to be in idle state, the terminal may transmit the uplink subframes #4 to #6. That is, the transmission of the uplink subframes #5 and #6 may be performed without additional channel access procedures.

Alternatively, the terminal may perform the channel access procedure in the symbol #0 of the slot #0 of the uplink subframe #4 (or the symbol #6 of the slot #1 of the uplink subframe #3), and when a channel status is determined to be in idle state, the terminal may transmit the uplink subframe #4. The terminal may perform the channel access procedure in the symbol #0 of the slot #0 of the uplink subframe #5 (or the symbol #6 of the slot #1 of the uplink subframe #4), and when a channel status is determined to be in idle state, the terminal may transmit the uplink subframe #5. The terminal may perform the channel access procedure in the symbol #0 of the slot #0 of the uplink subframe #6 (or the symbol #6 of the slot #1 of the uplink subframe #5), and when a channel status is determined to be in idle state, the terminal may transmit the uplink subframe #6. That is, the channel access procedure may be performed in each of the uplink subframes #4 to #6.

When the channel status is determined to be in idle state or the uplink transmission is performed without the channel access procedure, the terminal may configure an uplink subframe. Specifically, the terminal may identify a subframe number used for uplink transmission based on at least one of $N_{SF}$, l, k, and i included in the multi-uplink grant. In FIG. 15, the terminal may determine the subframes #4 to #6 as the uplink subframes. The terminal may identify the length of the uplink subframe used for the uplink transmission based on the length information included in the multi-uplink grant. For example, the terminal may identify the length of the uplink subframe based on Table 6 and Table 7, and configure the uplink subframe based on the identified length. Also, the terminal may identify a subframe number in which SRS is transmitted based on the SRS index included in the multi-uplink grant. For example, the terminal may identify the subframe number in which SRS is transmitted based on Table 10, and may configure the uplink subframe based on the identified subframe number.

That is, the terminal may perform the channel access procedure based on the information included in the multi-uplink grant, and when the channel status is determined to be in idle state by the channel access procedure, the terminal may transmit the uplink subframe configured based on the information included in the multi-uplink grant to the base station.

The base station may receive the uplink subframe from the terminal. For example, the base station may receive the uplink subframe based on the multi-uplink grant configured in the step S1620.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a terminal in a communication network, the operation method comprising:
receiving, from a base station, a first signaling message which includes information indicating that a multi-uplink grant used for scheduling a plurality of subframes is enabled among a single-uplink grant and the multi-uplink grant;
transmitting a second signaling message including an indicator indicating that the terminal supports a communication operation using the multi-uplink grant to the base station;
detecting a control channel of a subframe #n transmitted from the base station;
obtaining the multi-uplink grant including a scheduling delay offset from the control channel;
determining a position of a first subframe among the plurality of subframes scheduled by the multi-uplink grant using the scheduling delay offset; and
transmitting the plurality of subframes scheduled by the multi-uplink grant to the base station,
wherein the plurality of subframes include subframes #(n+l+k) to #(n+l+k+($N_{SF}$-1)), the subframe #(n+l+k) is the first subframe, n is an integer equal to or greater than 0, l is an integer equal to or greater than 4, k which means the scheduling delay offset is an integer equal to or greater than 0, and $N_{SF}$ indicates a number of the plurality of subframes scheduled by the multi-uplink grant.

2. The operation method according to claim 1, wherein information indicating a maximum number of subframes scheduled by the multi-uplink grant is included in the first signaling message.

3. The operation method according to claim 1, wherein the plurality of subframes scheduled by the multi-uplink grant are consecutive in time domain.

4. The operation method according to claim 1, wherein the multi-uplink grant further includes at least one of $N_{SF}$ and i, and i indicates an index of each of the plurality of subframes, which is one of 0, 1, . . . , ($N_{SF}$-1).

5. The operation method according to claim 1, wherein the multi-uplink grant further includes a starting position of a physical uplink shared channel (PUSCH) included in each of the plurality of subframes, or a starting position of a PUSCH included in the first subframe of the plurality of subframes.

6. The operation method according to claim 5, wherein the starting position is a single carrier-frequency division multiple access (SC-FDMA) symbol #0 among a plurality of SC-FDMA symbols included in a subframe, a specific time in the SC-FDMA symbol #0, or a SC-FDMA symbol #1.

7. The operation method according to claim 1, wherein the multi-uplink grant further includes an ending position of each of the plurality of subframes, or an ending position of a last subframe of the plurality of subframes.

8. The operation method according to claim 7, wherein the ending position is a last SC-FDMA symbol among a plurality of SC-FDMA symbols included in a subframe or a SC-FDMA symbol prior to the last SC-FDMA symbol.

9. The operation method according to claim 1, wherein the multi-uplink grant further includes a type of a channel access procedure to be performed by the terminal before transmission of the plurality of subframes.

10. The operation method according to claim 9, wherein, when the type indicates a type 1, the plurality of subframes are transmitted when a channel status is determined to be in an idle state for a period corresponding to a backoff selected within a contention window.

11. The operation method according to claim 10, wherein the contention window is set variably according to a channel access priority.

12. The operation method according to claim 9, wherein, when the type indicates a type 2, the plurality of subframes are transmitted when a channel status is determined to be in an idle state for a preconfigured period.

13. The operation method according to claim 1, wherein the multi-uplink grant further includes a common field and individual fields, the common field includes information commonly used for the plurality of subframes, and each of the individual fields includes different information used for each of the plurality of subframes.

14. The operation method according to claim 1, wherein the multi-uplink grant further includes a new data indicator (NDI) and a redundancy version (RV) for each of the plurality of subframes.

15. The operation method according to claim 1, wherein the multi-uplink grant further includes a hybrid automatic repeat request (HARQ) process number of the first subframe of the plurality of subframes, and at least one HARQ process number of at least one remaining subframe excluding the first subframe among the plurality of subframes is determined according to the HARQ process number of the first subframe and increase of a subframe number.

16. The operation method according to claim 1, wherein the multi-uplink grant further includes a sounding reference signal (SRS) index indicating a subframe number of a subframe in which a SRS is transmitted.

17. An operation method of a base station in a communication network, the operation method comprising:
transmitting, to a terminal, a first signaling message which includes information indicating that a multi-uplink grant used for scheduling a plurality of subframes is enabled among a single-uplink grant and the multi-uplink grant;
receiving, from the terminal, a second signaling message including an indicator indicating that the terminal supports a communication operation using the multi-uplink grant;
generating the multi-uplink grant;
transmitting a downlink control information (DCI) including the multi-uplink grant to the terminal through a subframe #n; and
receiving the plurality of subframes scheduled by the multi-uplink grant from the terminal,
wherein the plurality of subframes include subframes #(n+l+k) to #(n+l+k+($N_{SF}$-1)), n is an integer equal to or greater than 0, l is an integer equal to or greater than 4, k indicating a scheduling delay offset is an integer equal to or greater than 0, and $N_{SF}$ indicates a number of the plurality of subframes scheduled by the multi-uplink grant.

18. The operation method according to claim 17, wherein information indicating a maximum number of subframes scheduled by the multi-uplink grant is included in the first signaling message.

19. The operation method according to claim 17, wherein the plurality of subframes scheduled by the multi-uplink grant are consecutive in time domain.

20. The operation method according to claim 17, wherein the multi-uplink grant includes at least one of k, $N_{SF}$, and i, and i indicates an index of each of the plurality of subframes, which is one of 0, 1, . . . , ($N_{SF}$-1).

21. The operation method according to claim 17, wherein the multi-uplink grant includes a starting position of a physical uplink shared channel (PUSCH) included in each of the plurality of subframes, or a starting position of a PUSCH included in a first subframe of the plurality of subframes.

22. The operation method according to claim 21, wherein the starting position is a single carrier-frequency division multiple access (SC-FDMA) symbol #0 among a plurality of SC-FDMA symbols included in a subframe, a specific time in the SC-FDMA symbol #0, or a SC-FDMA symbol #1.

23. The operation method according to claim 17, wherein the multi-uplink grant includes an ending position of each of the plurality of subframes, or an ending position of a last subframe of the plurality of subframes.

24. The operation method according to claim 23, wherein the ending position is a last SC-FDMA symbol among a plurality of SC-FDMA symbols included in a subframe or a SC-FDMA symbol prior to the last SC-FDMA symbol.

25. The operation method according to claim 17, wherein the multi-uplink grant includes a common field and individual fields, the common field includes information commonly used for the plurality of subframes, and each of the individual fields includes different information used for each of the plurality of subframes.

26. The operation method according to claim 17, wherein the multi-uplink grant includes a new data indicator (NDI) and a redundancy version (RV) for each of the plurality of subframes.

27. The operation method according to claim 17, wherein the multi-uplink grant includes a hybrid automatic repeat request (HARQ) process number of a first subframe of the plurality of subframes, and at least one HARQ process number of at least one remaining subframe excluding the first subframe among the plurality of subframes is determined according to the HARQ process number of the first subframe and increase of a subframe number.

28. The operation method according to claim 17, wherein the multi-uplink grant includes a sounding reference signal (SRS) index indicating a subframe number of a subframe in which a SRS is transmitted.

29. The operation method according to claim 17, wherein the multi-uplink grant includes a type of a channel access procedure to be performed by the terminal before transmission of the plurality of subframes.

30. The operation method according to claim 29, wherein, when the type indicates a type 1, the plurality of subframes are received from the terminal when a channel status is determined to be in an idle state for a period corresponding to a backoff selected within a contention window.

31. The operation method according to claim 30, wherein the contention window is set variably according to a channel access priority.

32. The operation method according to claim 29, wherein, when the type indicates a type 2, the plurality of subframes are received from the terminal when a channel status is determined to be in an idle state for a preconfigured period.

* * * * *